(12) United States Patent
Cho et al.

(10) Patent No.: US 12,513,435 B2
(45) Date of Patent: Dec. 30, 2025

(54) IMAGE SENSOR AND ELECTRONIC DEVICE INCLUDING THE SAME

(71) Applicant: SAMSUNG ELECTRONICS CO., LTD., Suwon-si (KR)

(72) Inventors: Soonik Cho, Suwon-si (KR); Jahyun Koo, Suwon-si (KR); Dahsom Kim, Suwon-si (KR); Donghoon Sung, Suwon-si (KR); Seokyong Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 18/741,222

(22) Filed: Jun. 12, 2024

(65) Prior Publication Data

US 2024/0430598 A1 Dec. 26, 2024

(30) Foreign Application Priority Data

Jun. 22, 2023 (KR) .................. 10-2023-0080635

(51) Int. Cl.
| | |
|---|---|
| *H04N 25/78* | (2023.01) |
| *H03M 1/56* | (2006.01) |
| *H04N 25/51* | (2023.01) |
| *H04N 25/57* | (2023.01) |

(52) U.S. Cl.
CPC .............. *H04N 25/78* (2023.01); *H03M 1/56* (2013.01); *H04N 25/51* (2023.01); *H04N 25/57* (2023.01)

(58) Field of Classification Search
None
See application file for complete search history.

(56) References Cited

U.S. PATENT DOCUMENTS

| | | |
|---|---|---|
| 6,225,616 B1 | 5/2001 | Park |
| 9,185,316 B2 | 11/2015 | Cheon et al. |
| 10,447,956 B2 | 10/2019 | Shimamura et al. |
| 11,343,449 B2 | 5/2022 | Paik et al. |
| 11,431,939 B1 | 8/2022 | Fan et al. |
| 11,716,549 B2 | 8/2023 | Jung et al. |
| 2007/0132868 A1 | 6/2007 | Lee et al. |
| 2011/0101938 A1 | 5/2011 | Ma et al. |

(Continued)

FOREIGN PATENT DOCUMENTS

| | | |
|---|---|---|
| CN | 111385499 A | 7/2020 |
| CN | 112383725 A | 2/2021 |

(Continued)

*Primary Examiner* — Mark T Monk
(74) *Attorney, Agent, or Firm* — Sughrue Mion, PLLC

(57) ABSTRACT

An image sensor includes a pixel array, a ramp signal generating circuit configured to output a first reference ramp signal of a first slope as a first ramp signal in a first period and a second reference ramp signal of a second slope as the first ramp signal in a second period, an offset voltage sampling circuit configured to, to sample an offset voltage based on a DC level of the first reference ramp signal, to output the first ramp signal in the first period, and to output a signal obtained by adding the offset voltage to the first ramp signal as a second ramp signal in the second period, a buffer configured to buffer the first ramp signal and the second ramp signal, and an ADC circuit configured to compare a pixel signal from the pixel array with the first ramp signal or the second ramp signal.

20 Claims, 19 Drawing Sheets

(56) References Cited

U.S. PATENT DOCUMENTS

2014/0266309 A1* 9/2014 Jakobson ............ H03M 1/0639
　　　　　　　　　　　　　　　　　　　　　　　327/63
2023/0041316 A1　　2/2023　Jeong et al.

FOREIGN PATENT DOCUMENTS

| JP | 2020-120307 A | 8/2020 |
| KR | 10-0279294 B1 | 2/2001 |
| KR | 10-2005-0099720 A | 10/2005 |
| KR | 10-0746197 B1 | 8/2007 |
| KR | 10-2009-0099417 A | 9/2009 |
| KR | 10-2010-0133947 A | 12/2010 |
| KR | 10-2012-0059713 A | 6/2012 |
| KR | 10-1273119 B1 | 6/2013 |
| KR | 10-2018-0025234 A | 3/2018 |
| KR | 10-2021-0102517 A | 8/2021 |
| KR | 10-2022-0033298 A | 3/2022 |

* cited by examiner

# IMAGE SENSOR AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2023-0080635, filed on Jun. 22, 2023, in the Korean Intellectual Property Office, the disclosure of which is incorporated by reference herein in its entirety.

BACKGROUND

1. Field

Embodiments of the disclosure relate to an image sensor, and more particularly, to an image sensor capable of providing a high quality image having an extended dynamic range and an electronic device including the image sensor.

2. Description of Related Art

An image sensor is a device for capturing a two-dimensional (2D) or three-dimensional (3D) image of an object. The image sensor generates an image of the object by using a photoelectric conversion element that reacts according to the intensity of light reflected from the object. With the development of the complementary metal-oxide semiconductor (CMOS) technology, a CMOS image sensor using a CMOS has been widely used. Recently, as image sensors are mounted in various devices, an image sensor capable of generating an image having a high dynamic range (HDR) under low and high luminance conditions is required.

SUMMARY

Aspects of the disclosure relate to an image sensor and an electronic device including the image sensor.

Aspects of the disclosure relate to an image sensor capable of preventing a ground voltage from changing due to a discharge operation of an input capacitor of a correlated double sampling (CDS) circuit. For example, the change in the ground voltage may occur due to a change in an operation region of a ramp signal generated by a ramp voltage generating circuit in a situation in which an analog gain of an image sensor changes in order to implement a high dynamic range (HDR) image capture operation.

Aspects of the disclosure also relate to an electronic device including the image sensor capable of preventing a ground voltage from changing due to a discharge operation of an input capacitor of a correlated double sampling (CDS) circuit.

According to an aspect of the disclosure, there is provided an image sensor including: a pixel array including a plurality of pixels; a ramp signal generating circuit configured to output a first reference ramp signal with a first slope as a first ramp signal in a first period and a second reference ramp signal with a second slope as the first ramp signal in a second period different from the first period; an offset voltage sampling circuit configured to: receive the first ramp signal from the ramp signal generating circuit, obtain an offset voltage based on a direct current (DC) level of the first reference ramp signal, output the first ramp signal in the first period, and output a second ramp signal obtained by adding the offset voltage to the first ramp signal in the second period; a buffer configured to buffer and output the first ramp signal or the second ramp signal received from the offset voltage sampling circuit; and an analog-to-digital conversion (ADC) circuit configured to convert a pixel signal from the pixel array into a digital pixel value based on a comparison of the pixel signal with the first ramp signal or the second ramp signal from the buffer.

According to another aspect of the disclosure, there is provided an image sensor including: a pixel array including a plurality of pixels; a ramp signal generating circuit configured to output a first ramp signal; an offset voltage sampling circuit configured to obtain an offset voltage based on a direct current (DC) level of the first ramp signal in a first period; a buffer configured to: buffer the first ramp signal and output the buffered first ramp signal as a ramp signal in the first period, and buffer a second ramp signal obtained by adding the offset voltage to the first ramp signal and output the buffered second ramp signal as the ramp signal in a second period different from the first period; and an analog-to-digital conversion (ADC) circuit configured to convert a pixel signal from the pixel array into a digital pixel value based on a comparison of the pixel signal with the ramp signal from the buffer.

According to another aspect of the disclosure, there is provided an electronic device including: an image sensor configured to generate a first image with a first brightness value and a second image with a second brightness value; and an image signal processor configured to generate a high dynamic range (HDR) image by merging the first image and the second image from the image sensor, wherein the image sensor includes: a pixel array including a plurality of pixels; a ramp signal generating circuit configured to: generate a first reference ramp signal with a first direct current (DC) level as a first ramp signal in a first period, and generate a second reference ramp signal with a second DC level lower than the first DC level as the first ramp signal in a second period different from the first period; a buffer configured buffer and output a second ramp signal generated based on the first ramp signal; an offset voltage sampling circuit connected between the ramp signal generating circuit and the buffer, the offset voltage sampling circuit configured to: obtain an offset voltage based on the first DC level, in a first period, output the first reference ramp signal to the buffer as the second ramp signal, and in a second period, add the offset voltage to the second reference ramp signal to generate a third ramp signal, and output the third ramp signal to the buffer as the second ramp signal; and an analog-to-digital conversion (ADC) circuit configured to convert a pixel signal from the pixel array into a digital pixel value based on a comparison of the pixel signal with the ramp signal from the buffer.

According to another aspect of the disclosure, there is provided an image sensor including: a ramp signal generating circuit configured to output a first reference ramp signal with a first slope as a first ramp signal in a first period and a second reference ramp signal with a second slope as the first ramp signal in a second period different from the first period; a buffer configured to: receive the first ramp signal from the ramp signal generating circuit, in the first period, buffer the first ramp signal to output the buffered first ramp signal as a ramp signal, in the second period, add an offset voltage to the first ramp signal to generate a second ramp signal in the second period, and buffer the second ramp signal to output the buffered second ramp signal as the ramp signal; and an analog-to-digital conversion (ADC) circuit configured to convert a pixel signal from the pixel array into a digital pixel value based on a comparison of the pixel signal with the ramp signal from the buffer.

BRIEF DESCRIPTION OF DRAWINGS

Embodiments will be more clearly understood from the following detailed description taken in conjunction with the accompanying drawings in which.

DETAILED DESCRIPTION

Figure 1:
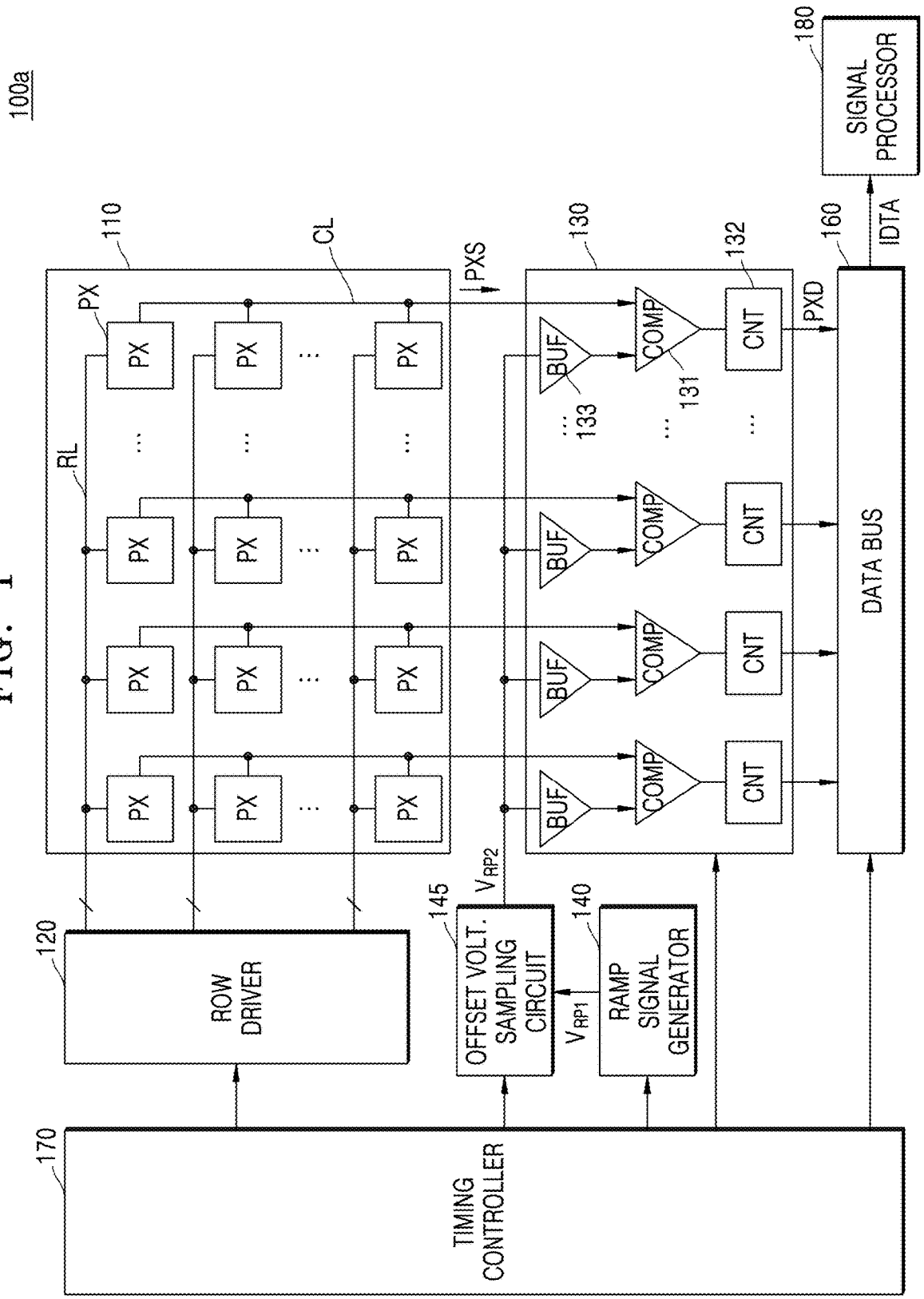
FIG. 1 is a block diagram illustrating an image sensor according to an embodiment.

Hereinafter, embodiments will be described in detail with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all example embodiments are not limited thereto.

The embodiments of the disclosure are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

FIG. 1 is a block diagram illustrating an image sensor 100a according to an embodiment.

Referring to FIG. 1, the image sensor 100a may be provided in an electronic device having an image capturing function or light sensing function. For example, the image sensor 100a may be mounted in an electronic device such as a camera, a smartphone, a wearable device, an Internet of things (IoT) device, a home appliance, a tablet personal computer (PC), a personal digital assistant (PDA), a portable multimedia player (PMP), a navigation, a drone, or an advanced driver assistance system (ADAS). In addition, the image sensor 100a may be mounted in an electronic device provided as components, such as a vehicle, furniture, manufacturing facilities, a door, and various measurement devices. However, the disclosure is not limited thereto, and as such, the image sensor 100a may be provided or mounted in another type of electronic device.

Referring to FIG. 1, the image sensor 100a may include a pixel array 110, a row driver 120, an analog-to-digital conversion (ADC) circuit 130, a ramp signal generator 140, an offset voltage sampling circuit 145, a data bus 160, a timing controller 170, and a signal processor 180. A configuration including the row driver 120, the ADC circuit 130, the ramp signal generator 140, and the offset voltage sampling circuit 145 may be referred to as a readout circuit. In an embodiment, the row driver 120 may be referred to as the row driver circuit 120, the ramp signal generator 140 may be referred to as the ramp signal generator circuit 140, and the timing controller 170 may be referred to as the timing controller circuit 170. According to an embodiment, the image sensor 100a may include other components in addition to the components illustrated in FIG. 1. In another embodiment, one or more of the components illustrated in FIG. 1 may be combined or omitted to perform the operations described below.

The pixel array 110 may include a plurality of pixels PX connected to a plurality of row lines RL and a plurality of column lines CL and arranged in a matrix. Each of the plurality of pixels PX may include an active pixel sensor (APS).

In an embodiment, the plurality of pixels PX arranged in the same column may be respectively connected to the plurality of column lines CL. However, the disclosure is not limited thereto, and as such, according to another embodiment, the plurality of pixels PX arranged in the same column may be respectively connected to different column lines CL. The pixel PX may output a pixel signal PXS through a corresponding column line CL. For example, the pixel signal may be a pixel voltage output through the corresponding column line CL.

The pixel PX may detect light by using a photoelectric conversion element and may output an image signal as an electrical signal according to the detected light. The photoelectric conversion element may include a photo-sensing element including an organic material or an inorganic material, such as a photodiode, an organic photofilm, a perovskite photodiode, a phototransistor, a photogate, or a pinned photodiode. The photodiode may be an inorganic photodiode. Hereinafter, the photodiode as the photoelectric conversion element will be described as an example. However, the disclosure is not limited thereto, and as such, other types of photoelectric conversion elements may be implemented in the operations described below.

A microlens for condensing light may be arranged on each of the plurality of pixels PX or on each pixel group including adjacent pixels PX. A color filter for transmitting light in a specific spectral region may be arranged on each of the plurality of pixels PX, and each of the plurality of pixels PX may detect the light in the specific spectral region from the light received through the microlens based on the corresponding color filter. For example, the pixel array 110 may include a red pixel converting light in a red spectral region into an electrical signal, a green pixel converting light in a green spectral region into an electrical signal, and a blue pixel converting light in a blue spectral region into an electrical signal. However, the disclosure is not limited thereto, and as such, according to another embodiment, the pixel array 110 may further include white pixels. Alternatively, the pixel array 110 may include pixels according to another color combination, for example, cyan pixels, yellow pixels, green pixels, and magenta pixels.

In an embodiment, the pixel PX may operate in one of a plurality of conversion gain modes. For example, the pixel PX may operate in a high conversion gain (HCG) mode or a low conversion gain (LCG) mode. The pixel PX may output HCG pixel signals (a reset signal and an image signal) in the HCG mode and LCG pixel signals (a reset signal and an image signal) in the LCG mode. The HCG pixel signals may include a HCG reset signal and a HCG image signal, and the LCG pixel signals may include a LCG reset signal and a LCG image signal.

In an embodiment, the pixel PX may operate in the HCG mode in a low luminance environment and in the LCG mode in a high luminance environment. In an embodiment, the pixel PX may operate in the HCG mode in a first frame and in the LCG mode in a second frame following the first frame. In an embodiment, the pixel PX may operate in the HCG mode and the LCG mode in one frame. For example, the pixel PX may operate in the HCG mode and the LCG mode in a time division manner in one horizontal period of one frame. The pixel PX may operate in the LCG mode in a first period of one horizontal period and in the HCG mode in a second period of one horizontal period. The pixel PX may output LCG pixel signals in the first period and HCG pixel signals in the second period.

In an embodiment, the pixel PX may have a pixel structure in which several photodiodes share a floating diffusion node. For example, a first photodiode and a second photodiode may share a floating diffusion node. However, the disclosure is not limited to two photodiodes sharing a floating diffusion node. Light receiving areas of the photodiodes may be the same or different.

The row driver 120 may drive the pixel array 110 in units of one or a plurality of rows. The row driver 120 may decode a row control signal received from the timing controller 170 and may select at least one row to be read out of a plurality of rows of the pixel array 110 based on the decoded row control signal. For example, the row driver 120 may decode a row address from the row control signal and select at least one row to be read out based on the row address.

The row driver 120 may provide control signals to at least one selected row through row lines RL. The control signals may include, but is not limited to, a selection signal, transmission control signals, a conversion control signal, and switching signals. The pixels PX included in a pixel row selected by the selection signal provided by the row driver 120 output pixel signals. For example, the pixel signals may be pixel voltages.

The ramp signal generator 140 (or referred to as a ramp signal generating circuit) may generate a ramp signal (or referred to as a ramp voltage) increasing or decreasing at a slope. The slope may be a predetermined slope. For example, the ramp signal may be a first ramp signal $V_{RP1}$. The first ramp signal $V_{RP1}$ may be a reference for all ramp signals used by the ADC circuit 130. The ramp signal generator 140 may change the slope of the first ramp signal $V_{RP1}$ according to analog gain setting. For example, the ramp signal generator 140 may generate a first reference ramp signal at a first slope in the first period and a second reference ramp signal at a second slope lower than the first slope in the second period following the first period. Here, an initial voltage of the second reference ramp signal may be lower than an initial voltage of the first reference ramp signal. For example, a second direct current (DC) level (or a second DC voltage), which is the initial voltage of the second reference ramp signal, may be lower than a first DC level (or a first DC voltage), which is the initial voltage of the first reference ramp signal. The ramp signal generator 140 may output the first reference ramp signal or the second reference ramp signal as the first ramp signal $VRP_1$.

The offset voltage sampling circuit 145 may sample an offset voltage based on a DC level of the first ramp signal $V_{RP1}$ received from the ramp signal generator 140. For example, the offset voltage sampling circuit 145 may determine an offset voltage based on the DC level of the first ramp signal $V_{RP1}$. The offset voltage sampling circuit 145 may output the first ramp signal $V_{RP1}$ to the ADC circuit 130 as a second ramp signal $V_{RP2}$ or may add the offset voltage to the first ramp signal $V_{RP1}$ and may output a signal obtained by adding the offset voltage to the first ramp signal $V_{RP1}$ to the ADC circuit 130 as the second ramp signal $V_{RP2}$.

For example, in the first period, the offset voltage sampling circuit 145 may receive the first ramp signal $V_{RP1}$ generated based on the first reference ramp signal and output the first ramp signal $V_{RP1}$ as the second ramp signal $V_{RP2}$. In the second period, the offset voltage sampling circuit 145 may receive the first ramp signal $V_{RP1}$ generated based on the second reference ramp signal, add the offset voltage to the first ramp signal $V_{RP1}$, and output the addition result to the ADC circuit 130 as the second ramp signal $V_{RP2}$. As described above, the DC level of the second reference ramp signal is lower than the DC level of the first reference ramp signal. As the offset voltage sampling circuit 145 adds the offset voltage to the second reference ramp signal to generate the second ramp signal $V_{RP2}$, although the analog gain setting changes, the DC level of the second ramp signal $V_{RP2}$ may be maintained or may not change significantly.

The ADC circuit 130 may include a plurality of comparators 131, a plurality of counters 132, and a plurality of buffers 133 (or referred to as column buffers), and may convert pixel signals (for example, pixel voltages) output from the pixel array 110 into pixel values as digital signals.

The ADC circuit 130 may convert each of the pixel signals into a pixel value in a correlated double sampling (CDS) method, and the plurality of comparators 131 may be referred to as CDS circuits.

The buffer 133 may buffer the second ramp signal $V_{RP2}$ received from the offset voltage sampling circuit 145 and may provide the buffered second ramp signal RP to the corresponding comparator 131 among the plurality of comparators 131.

It is illustrated in FIG. 1 that one buffer 133 provides the second ramp signal $V_{RP2}$ to one comparator 131. However, the disclosure is not limited thereto, and as such, according to another embodiment, one buffer 133 may provide the second ramp signal $V_{RP2}$ to the plurality of comparators 131.

The comparator 131 may compare the pixel signal PXS received through the column line CL with the received ramp signal and may output a comparison result signal. For example, the received ramp signal may be second ramp signal $V_{RP2}$. The comparator 131 may output the comparison result signal transitioning from a first level (for example, logic high) to a second level (for example, logic low) when the second ramp signal $V_{RP2}$ decreasing at a specific slope becomes the same as or lower than the pixel signal PXS.

The comparator 131 may sample and hold a reset signal provided by the pixel PX in the CDS method, and may sample a signal obtained by adding the reset signal to the image signal received from the pixel PX. The comparator 131 may output a first comparison result signal corresponding to the reset signal and a second comparison result signal corresponding to the image signal.

The counter 132 may generate a pixel signal by subtracting the reset signal from the image signal by counting a period until the comparison result signal output from the comparator 131 transitions from the first level to the second level. In an embodiment, the counter 132 may generate a reset value by counting the first comparison result signal, generate an image value by counting the second comparison result signal, and generate a pixel value PXD by subtracting the reset value from the image value.

As described above, the ramp signal generator 140 may generate the first reference ramp signal at the first slope, and the offset voltage sampling circuit 145 may output the second ramp signal $V_{RP2}$ based on the first reference ramp signal to the buffer 133. In the second period, the ramp signal generator 140 may generate the second reference ramp signal at the second slope and the offset voltage sampling circuit 145 may add the offset voltage to the second reference ramp signal and may output a signal obtained by adding the offset voltage to the second reference ramp signal to the buffer 133 as the second ramp signal $V_{RP2}$. In an embodiment, the pixel array 110 may output an LCG pixel signal in the first period and an HCG pixel signal in the second period.

The ADC circuit 130 may compare the second ramp signal $V_{RP2}$ based on the first reference ramp signal with the LCG pixel signals in the first period to generate first image data with a first brightness, and may compare the second ramp signal $V_{RP2}$ based on the second reference ramp signal and the offset voltage with the HCG pixel signals in the second period to generate second image data with a second brightness.

The data bus 160 may temporarily store the pixel values PXD received from the ADC circuit 130 and may output the pixel values PXD to the signal processor 180. In another embodiment, the data bus 160 may output the pixel values PXD to an external device of the image sensor 100a. The external device may include, but is not limited to, an application processor. In an embodiment, the data bus 160 may provide pixel values to the signal processor 180 in units of at least one line of the pixel array 110. The data bus 160 may include a plurality of column memories and column decoders, and the plurality of pixel values stored in the plurality of column memories may be output as image data IDTA under control of the plurality of column decoders.

The timing controller 170 may output a timing control signal to each of the row driver 120, the ADC circuit 130, the ramp signal generator 140, the offset voltage sampling circuit 145, and the data bus 160 to control operations and operation timing of the row driver 120, the ADC circuit 130, the ramp signal generator 140, the offset voltage sampling circuit 145, and the data bus 160.

The signal processor 180 may perform image processing on the received image data IDTA (for example, the first image data and/or the second image data). For example, the signal processor 180 may change a data pattern of pixel values of the received image data IDTA. For example, the signal processor 180 may change raw data into an RGB pattern. In another embodiment, the signal processor 180 may perform signal processing such as noise reduction processing, gain control, waveform shaping processing, interpolation processing, white balance processing, gamma processing, edge emphasis processing, binning, downsizing, or image quality compensation on the received image data IDTA, and the image quality compensation may include signal processing such as black level compensation, lens shading compensation, crosstalk compensation, or bad pixel correction.

In an embodiment, the signal processor 180 may merge the first image data and the second image data with different brightness with each other to generate an HDR image.

The image data IDTA image-processed by the image signal processor 180 may be transmitted to an external processor. For example, the external processor may include a host processor of an electronic device in which the image sensor 100a is mounted. For example, the external processor may include an application processor of a mobile terminal. The image sensor 100a may transmit the image data IDTA to the external processor according to a data communication method based on a set interface, for example, a mobile industry processor interface (MIPI). The external processor may receive the first image data and the second image data with different brightness as the image data IDTA, and may merge the first image data with the second image data to generate the HDR image.

In the image sensor 100a according to the embodiment, although an output voltage of the ramp signal generator 140 is changed for HDR implementation (which changes an operating region of the first ramp signal $V_{RP1}$ as the analog gain setting of the ramp signal generator 140), because the offset voltage sampling circuit adds the offset voltage to the first ramp signal $V_{RP1}$ to output the result of the addition, no change occurs in the operating region of the second ramp signal $V_{RP2}$ provided to the buffer 133, or a change in the operating region of the second ramp signal $V_{RP2}$ may not be large.

In an example case in which the change in the operating region of the second ramp signal $V_{RP2}$ is large, a change in an amount of charges charged in an input capacitor (for example, a second input capacitor C2 of FIG. 3) provided in the comparator 131 becomes large. For example, charges are discharged from the input capacitor to a first power supply voltage (for example, a ground voltage) VSS through the buffer 133, and when an amount of the discharged charges is large, a fluctuation occurs in the first power supply voltage. Accordingly, a pedestal error may occur in the second period. However, in the image sensor 100a according to the embodiment, although the analog gain setting of the ramp signal generator 140 changes, because the operating region of the second ramp signal $V_{RP2}$ provided to the buffer 133 does not change or a change in the operating region of the second ramp signal $V_{RP2}$ is not large, the first power supply voltage does not change and occurrence of errors may be reduced.

Figure 2:
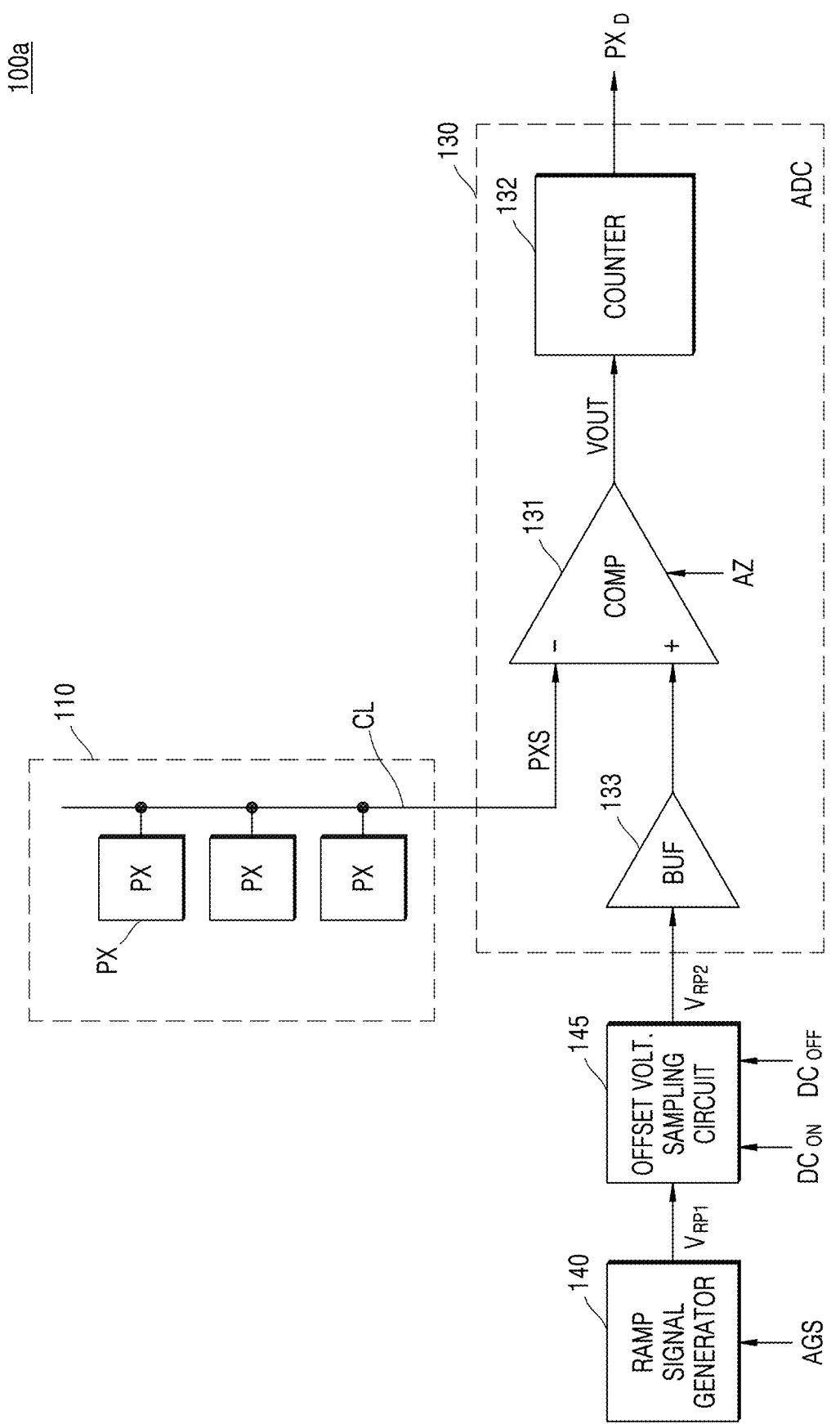
FIG. 2 illustrates converting a pixel signal into a pixel value in an image sensor according to an embodiment.

FIG. 2 illustrates converting a pixel signal into a pixel value PXD in an image sensor 100a according to an embodiment.

Referring to FIG. 2, the pixel PX of the pixel array 110 outputs the pixel signal PXS to the ADC circuit 130 through the column line CL. The pixel signal PXS may be applied to a second input terminal (−) of the comparator 131. The pixel PX may output the LCG pixel signal in the first period of one horizontal period, and the HCG pixel signal in the second period of one horizontal period. Here, the one horizontal period may mean a unit period in which pixels PX arranged in one or more rows of the pixel array 110 are simultaneously read.

The ramp signal generator 140 may generate the first ramp signal $V_{RP1}$ of which signal level decreases (or increases) at a predetermined slope. The ramp signal generator 140 may change the slope and an initial value of the first ramp signal $V_{RP1}$ based on an analog gain setting value AGS. In another example, the ramp signal generator 140 may change the reset value or the DC level. The change may be periodical.

For example, the ramp signal generator 140 may generate the first reference ramp signal at the first slope in the first period and the second reference ramp signal at the second slope in the second period. For example, a first initial value and the first slope of the first reference ramp signal in an example case in which the analog gain setting value AGS is 1 may be 16 times a second initial value and the second slope of the second reference ramp signal in an example case in which the analog gain setting value AGS is 16. The ramp signal generator 140 may output the first reference ramp signal as the first ramp signal $V_{RP1}$ in the first period and the second reference ramp signal as the first ramp signal $V_{RP1}$ in the second period.

The offset voltage sampling circuit 145 may generate the second ramp signal $V_{RP2}$ based on the first ramp signal $V_{RP1}$, and may provide the second ramp signal $V_{RP2}$ to the buffer 133. The offset voltage sampling circuit 145 may provide the first ramp signal $V_{RP1}$ (for example, the first reference ramp signal) output from the ramp signal generator 140 to the buffer 133 as the second ramp signal $V_{RP2}$ in the first period.

The offset voltage sampling circuit 145 may sample the first initial value (for example, the DC level) of the first reference ramp signal based on a sampling control signal $DC_{ON}$ and a sampling control sub-signal $DC_{OFF}$ at the end of the first period. For example, the offset voltage sampling circuit 145 may obtain the offset voltage by sampling the first initial value (for example, the DC level) of the first reference ramp signal.

The offset voltage sampling circuit 145 may add the offset voltage to the first ramp signal (for example, the second reference ramp signal) output from the ramp signal generator 140 in the second period, and may provide a signal obtained by adding the offset voltage to the second reference ramp signal to the buffer 133 as the second ramp signal $V_{RP2}$.

Accordingly, although the operating region (for example, the DC level) of the first ramp signal $V_{RP1}$ output from the ramp signal generator 140 changes significantly as the analog gain setting value AGS changes, there may be no change in the operating region of the second ramp signal $V_{RP2}$ and the operating region of the second ramp signal $V_{RP2}$ may not change significantly.

The ADC circuit 130 may include the comparator 131, the counter 132, and the buffer 133. It is illustrated in FIG. 2 that the ADC circuit 130 includes one comparator 131, one counter 132, and one buffer 133. However, the disclosure is not limited thereto, and as such, according to another embodiment, the ADC circuit 130 may include the plurality of comparators 131, the plurality of counters 132, and the plurality of buffers 133 as illustrated in FIG. 1. The second ramp signal $V_{RP2}$ may be provided to the plurality of buffers 133.

The buffer 133 may buffer the second ramp signal $V_{RP2}$ received from the offset voltage sampling circuit 145 and may provide the buffered second ramp signal $V_{RP2}$ to a first input terminal+of the comparator 131.

In the first period, the comparator 131 may compare the LCG pixel signal received through the column line CL with the second ramp signal $V_{RP2}$ (for example, the first ramp signal $V_{RP1}$) provided by the buffer 133 and may output a comparison result signal OUT. In the second period, the comparator 131 may compare the HCG pixel signal received through the column line CL with the second ramp signal $V_{RP2}$ (for example, the signal obtained by adding the offset voltage to the first ramp signal $V_{RP1}$) provided by the buffer 133 and may output a comparison result signal OUT.

The counter 132 may generate the pixel value PXD by counting the comparison result signal OUT of the comparator 131, generate the LCG pixel value in the first period, and generate the HCG pixel value in the second period. In an embodiment, LCG pixel values corresponding to the plurality of pixels PX of the pixel array 110 may constitute the first image data with the first brightness, and HCG pixel values corresponding to the plurality of pixels PX of the pixel array 110 may constitute the second image data with the second brightness.

Figure 3:
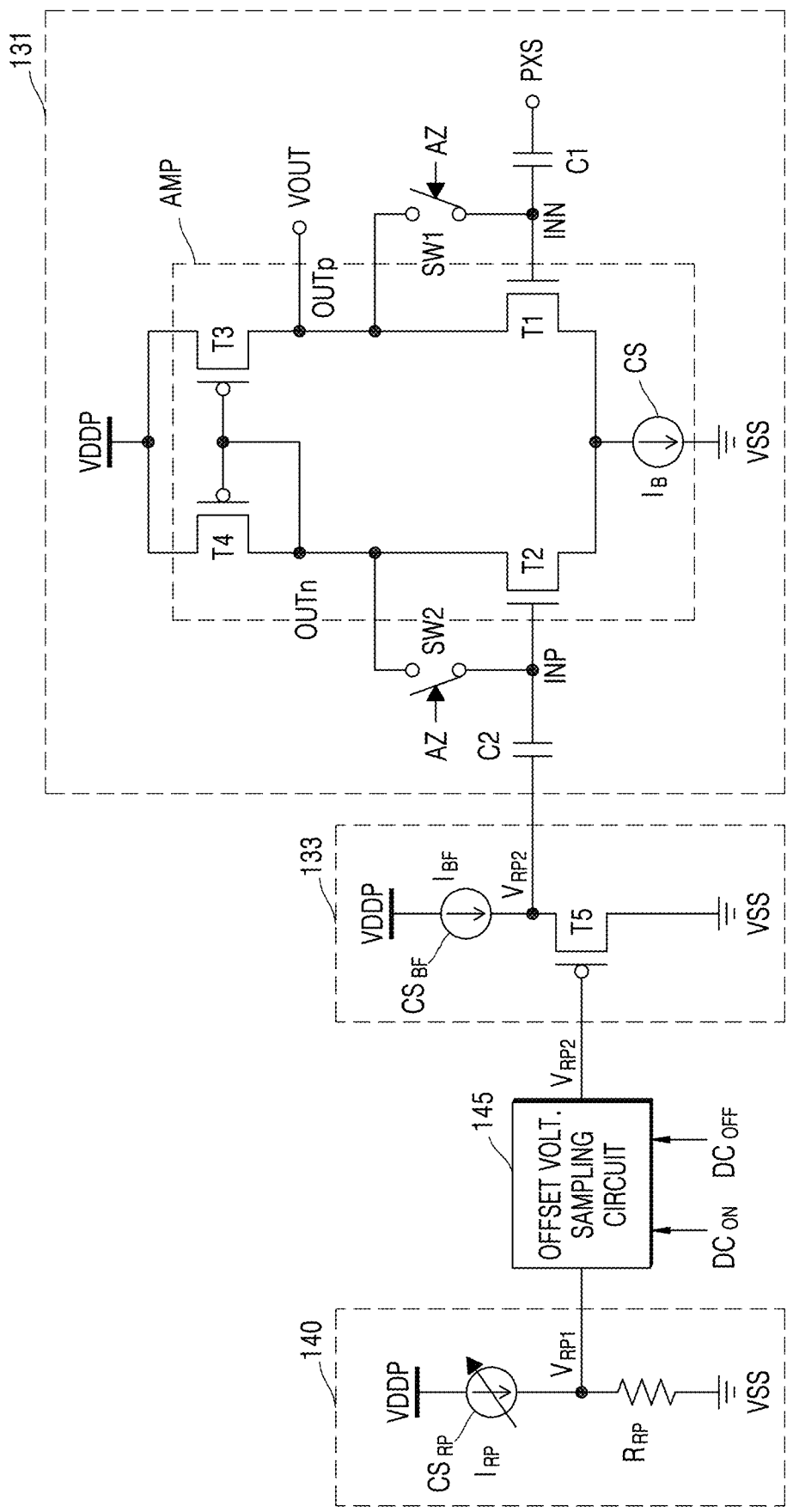
FIG. 3 is a circuit diagram illustrating a ramp signal generator, a buffer, and a comparator of an image sensor according to an embodiment.

FIG. 3 is a circuit diagram illustrating the ramp signal generator 140, the buffer 133, and the comparator 131 of the image sensor 100a according to an embodiment.

Referring to FIG. 3, the ramp signal generator 140 may include a current source $CS_{RP}$ and a resistor $R_{RP}$. A second power supply voltage VDDP may be applied to one end of the current source $CS_{RP}$, and one end of the resistor $R_{RP}$ may be connected to the other end of the current source $CS_{RP}$. The first power supply voltage (for example, the ground voltage) VSS may be applied to the other end of the resistor $R_{RP}$. A voltage level of the second power supply voltage VDDP may be higher than a voltage level of the first power supply voltage VSS.

The current source $CS_{RP}$ may generate a reference current $I_{RP}$, and the reference current $I_{RP}$ may change according to the analog gain setting value AGS. For example, an amount of the reference current $I_{RP}$ in an example case in which the analog gain setting value AGS is 1 may be 16 times greater than an amount of the reference current $I_{RP}$ in an example case in which the analog gain setting value AGS is 16.

In an embodiment, the reference current $I_{RP}$ has a fixed amount, and a resistance value of the resistor $R_{RP}$ may change according to the analog gain setting value AGS. For example, the resistance value in an example case in which the analog gain setting value AGS is 1 may be 16 times greater than the resistance value in an example case in which the analog gain setting value AGS is 16.

In this manner, the amount of the reference current $I_{RP}$ of the current source $CS_{RP}$ or the resistance value of the resistor $R_{RP}$ may change according to the analog gain setting value AGS, and accordingly, the initial value and slope of the first ramp signal $V_{RP1}$ may change according to the analog gain setting value AGS.

The comparator 131 may include a differential amplifier AMP, a first input capacitor C1, a second input C2, and auto-zero switches. For example, the auto-zero switches may be a first auto-zero switch SW1 and a second auto-zero switch SW2.

In an embodiment, the differential amplifier AMP may be implemented as an operational transconductance amplifier (OTA). The differential amplifier AMP may include a current source CS generating a bias current $I_B$, an input stage including first and second transistors T1 and T2, and an output stage including third and fourth transistors T3 and T4. In an embodiment, the first and second transistors T1 and T2 may be implemented as n-type metal oxide semiconductor field effect transistor (MOSFET) (NMOS) transistors, and the third and fourth transistors T3 and T4 may be implemented as p-type MOSFET (PMOS) transistors. However, the disclosure is not limited thereto, and as such, according to another embodiment, transistors constituting the input stage of the differential amplifier AMP may be implemented as PMOS transistors, and transistors constituting the output stage may be implemented as NMOS transistors. In addition, the differential amplifier AMP may include a larger number of transistors to improve characteristics.

The first auto-zero switch SW1 may be connected between a first input terminal INP and a second output terminal OUTn of the differential amplifier AMP, and the second auto-zero switch SW2 may be connected between a second input terminal INN and a first output terminal OUTp of the differential amplifier AMP. In an embodiment, the first and second auto-zero switches SW1 and SW2 may be implemented as transistors.

The first and second auto-zero switches SW1 and SW2 may be turned on and off based on an auto-zero signal AZ, and may be turned on based on the auto-zero signal AZ at an active level to connect the first input terminal INP and the second output terminal OUTn of the differential amplifier AMP to each other, and to connect the second input terminal INN and the first output terminal OUTp of the differential amplifier AMP to each other. As a result, the first input terminal INP, the second input terminal INN, the first output terminal OUTp, and the second output terminal OUTn of the differential amplifier AMP have the same voltage level (for example, an operating voltage of the differential amplifier AMP, referred to as an auto-zero level).

Accordingly, an offset of the differential amplifier AMP is canceled, and the operating voltage of the differential amplifier AMP is determined to be the auto-zero level. The operation of the comparator 131 based on an auto-zero signal AX is referred to as an auto-zero operation and may be performed at the beginning of the first and second periods (for example, before a comparison operation between a pixel signal VPX and the second ramp signal $V_{RP2}$ is performed).

The first input capacitor C1 and the second input capacitor C2 may block DC components (for example, DC levels) of received signals. The first input capacitor C1 may receive the pixel signal PXS and may provide the pixel signal PXS of which DC component is blocked, that is, an alternate current (AC) component (for example, an AC level) of the pixel signal PXS to the second input terminal INN of the differential amplifier AMP. The second input capacitor C2 may receive a ramp signal output from the buffer 133, for example, the buffered second ramp signal $V_{RP2}$, and may provide the second ramp signal $V_{RP2}$ of which DC level is blocked to the first input terminal INP of the differential amplifier AMP.

The buffer 133 may be implemented as a source follower circuit including a current source $CS_{BF}$ and a fifth transistor T5. The second power supply voltage VDDP is applied to a first end of the current source $CS_{BF}$, and a first end of the fifth transistor T5 is connected to a second end of the current source $CS_{BF}$. The first power supply voltage VSS may be applied to the other end of the fifth transistor T5.

The current source $CS_{BF}$ may generate a load current $I_{BF}$. The load current $I_{BF}$ may have a fixed amount during the operation of the image sensor 100a of FIG. 1. However, the load current $I_{BF}$ may be calibrated to improve the characteristics of the buffer 133.

The second ramp signal $V_{RP2}$ may be applied to a gate terminal of the fifth transistor T5, and a ramp signal based on the second ramp signal $V_{RP2}$, for example, the buffered second ramp signal $V_{RP2}$, may be output through the first end of the fifth transistor T5. As the second ramp signal $V_{RP2}$ is changed, the buffered second ramp signal $V_{RP2}$ may also be changed.

Figure 4A:
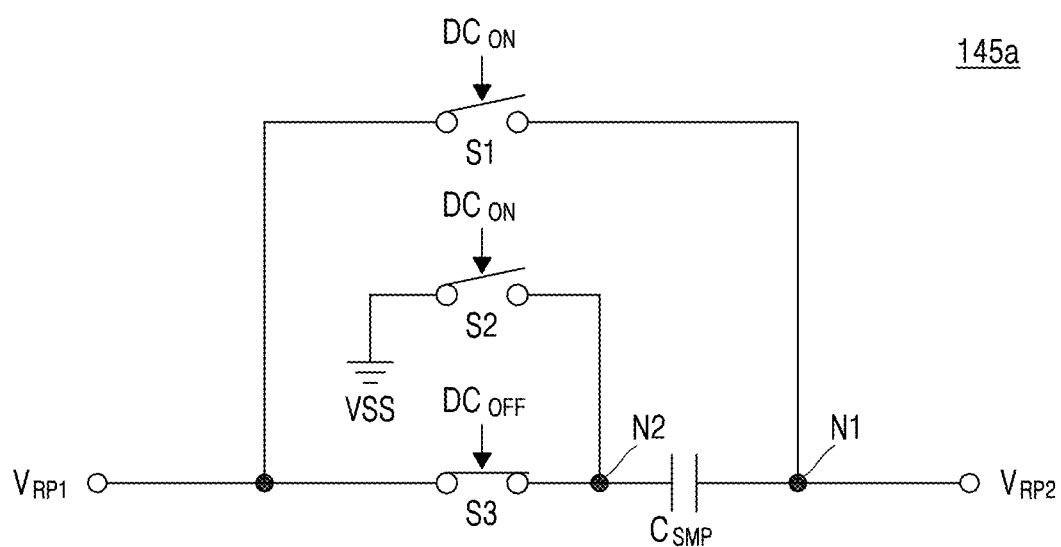
FIGS. 4A, 4B, and 4C are circuit diagrams illustrating offset voltage sampling circuits according to various embodiments.
Figure 4B:
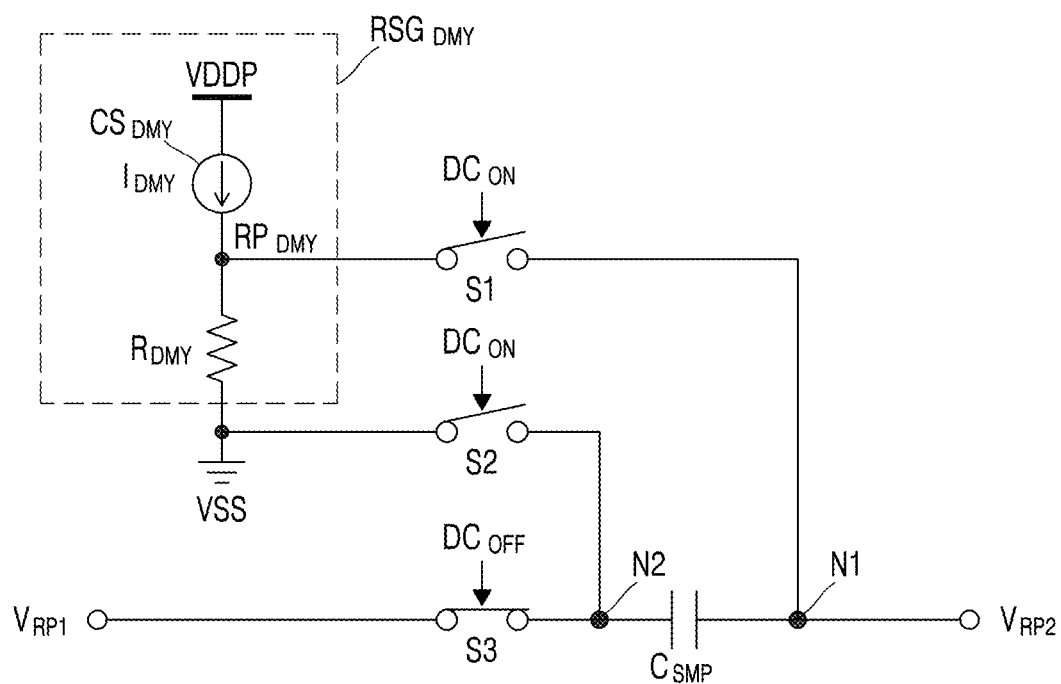
Figure 4C:
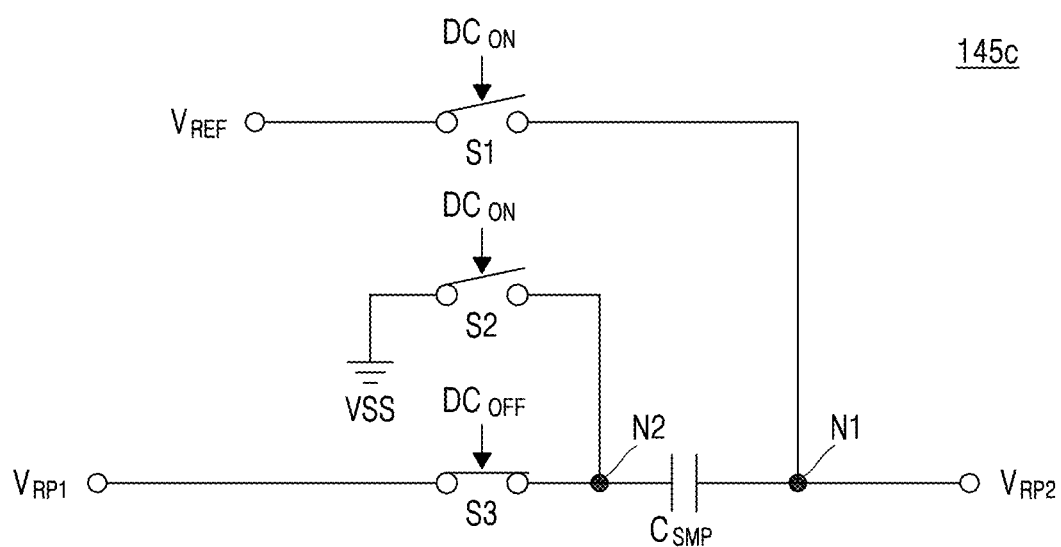
Figure 5:
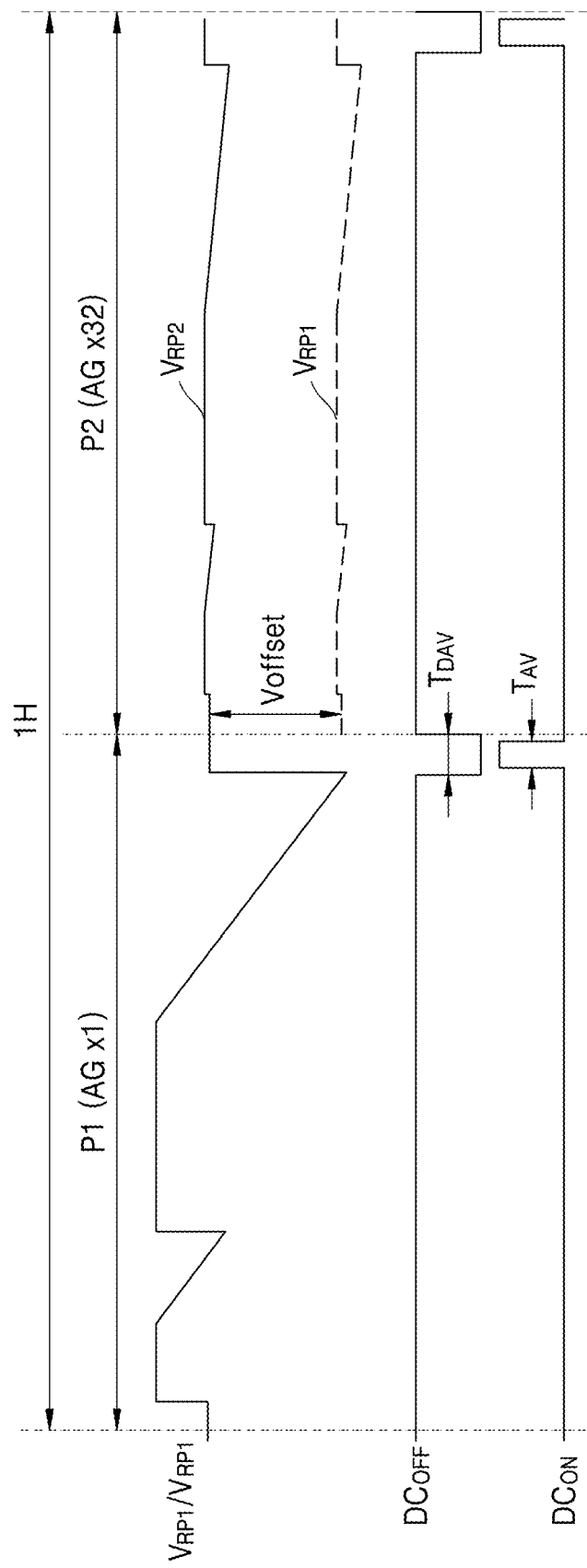
FIG. 5 is a timing diagram illustrating an operation of an offset voltage sampling circuit.

FIGS. 4A, 4B, and 4C are circuit diagrams illustrating offset voltage sampling circuits 145a, 145b, and 145c according to various embodiments, and FIG. 5 is a timing diagram illustrating operations of the offset voltage sampling circuits 145a, 145b, and 145c.

Referring to FIG. 4A, the offset voltage sampling circuit 145a may include a sampling capacitor $C_{SMP}$ and a plurality of sampling switches, for example, a first sampling switch S1, a second sampling switch S2, and a third sampling switch S3. In an embodiment, the first to third sampling switches S1, S2, and S3 may be implemented as transistors.

A first terminal N1 of the sampling capacitor $C_{SMP}$ may be connected to an input terminal of the buffer 133 of FIG. 1, for example, the gate terminal of the fifth transistor T5 of FIG. 4, and a second terminal of the third sampling switch S3 may be connected to a second terminal N2 of the sampling capacitor $C_{SMP}$.

A first terminal of the first sampling switch S1 and a first terminal of the third sampling switch S3 may be connected to an output terminal of the ramp signal generator 140 of FIG. 1 (for example, one end of the resistor $R_{RP}$). A second terminal of the first sampling switch S1 may be connected to a first terminal IN1 of the sampling capacitor $CS_{SMP}$. The first power supply voltage VSS may be applied to a first terminal of the second sampling switch S2, and a second terminal of the second sampling switch S2 may be connected to a second terminal IN2 of the sampling capacitor $C_{SMP}$.

The first and second sampling switches S1 and S2 may be turned on or off based on a sampling control signal $DC_{ON}$. The first sampling switch S1 may be turned on based on the sampling control signal $DC_{ON}$ at an active level to apply the first ramp signal $V_{RP1}$ to the first terminal N1 of the sampling capacitor $C_{SMP}$. The second sampling switch S2 may be turned on based on the sampling control signal $DC_{ON}$ at the active level to apply the first power supply voltage VSS to the second terminal N2 of the sampling capacitor $C_{SMP}$.

The third sampling switch S3 may be turned on and off based on the sampling control sub-signal $DC_{OFF}$. The third sampling switch S3 may be turned on based on a sampling control sub-signal $DC_{OFF}$ at an active level to provide the first ramp signal $V_{RP1}$ to the second terminal N2 of the sampling capacitor $C_{SMP}$.

Referring to FIG. 5, one horizontal period 1H may include a first period P1 and a second period P2, and an analog gain AG (that is, the analog gain setting value) may be set to 1 in the first period P1 and may be set to 32 in the second period P2. Accordingly, an initial value (an initial voltage) of the first ramp signal $V_{RP1}$ in the second period P2 may be less than an initial value (an initial voltage) of the first ramp signal $V_{RP1}$ in the first period P1, and a slope of the first ramp signal $V_{RP1}$ in the second period P2 may be lower than a slope of the first ramp signal $V_{RP1}$ in the first period P1.

In the first period P1, the first lamp signal $V_{RP1}$ and the second lamp signal $V_{RP2}$ may be the same. The sampling control signal $DC_{ON}$ may be at an inactive level (for example, logic low) and the sampling control sub-signal $DC_{OFF}$ may be at an active level (for example, logic high), the first and second sampling switches S1 and S2 may be turned off based on the sampling control signal $DC_{ON}$ at the inactive level, and the third sampling switch S3 may be turned on based on the sampling control sub-signal $DC_{OFF}$ at the active level. Accordingly, the first ramp signal $V_{RP1}$ may be output as the second ramp signal $V_{RP2}$ through the sampling capacitor $C_{SMP}$.

At the end of the first period P1, the sampling control signal $DC_{ON}$ may be at an active level and the sampling control sub-signal $DC_{OFF}$ may be at an inactive level. The third sampling switch S3 may be turned off based on the sampling control sub-signal $DC_{OFF}$ at the inactive level so that the first ramp signal $V_{RP1}$ may be prevented from being provided to the sampling capacitor $C_{SMP}$. The first and second sampling switches S1 and S2 are turned on based on the sampling control signal $DC_{ON}$ at the active level so that charges according to the first ramp signal $V_{RP1}$ of the sampling switch $C_{SMP}$ may be charged. In other words, the sampling switch $C_{SMP}$ may sample the offset voltage based on the first ramp signal $V_{RP1}$.

In an embodiment, a period $T_{DAV}$ in which the sampling control sub-signal $DC_{OFF}$ is at the inactive level may be longer than a period $T_{AV}$ in which the sampling control signal $DC_{ON}$ is at the active level. Accordingly, the first ramp signal $V_{RP1}$ and the first power supply voltage VSS are simultaneously applied to the second terminal IN2 of the sampling switch $C_{SMP}$ so that an unexpected short current may be prevented from flowing.

Then, the initial value of the first ramp signal $V_{RP1}$ may be reduced in the second period P2. The first and second sampling switches S1 and S2 may be turned off based on the sampling control signal $DC_{ON}$ at the inactive level, and the third sampling switch S3 may be turned on based on the sampling control sub-signal $DC_{OFF}$ at the active level. The first ramp signal $V_{RP1}$ may be applied to the second terminal N2 of the sampling capacitor $C_{SMP}$. Because the sampling capacitor $C_{SMP}$ stores the offset voltage, a signal obtained by adding the offset voltage to the first ramp signal $V_{RP1}$ may be output to the buffer 133 of FIG. 1 through the first terminal N1 of the sampling capacitor $C_{SMP}$.

Referring to FIG. 4B, the offset voltage sampling circuit 145b may include a sampling capacitor $C_{SMP}$, a dummy ramp signal generator $RSG_{DMY}$, and a plurality of sampling switches, for example, first to third sampling switches S1, S2, and S3.

The offset voltage sampling circuit 145b of FIG. 4B is a modified example of the offset voltage sampling circuit 145a of FIG. 4A, and thus, a difference from the offset voltage sampling circuit 145a of FIG. 4A will be mainly described and previously given description will be omitted.

Compared to the offset voltage sampling circuit 145a of FIG. 4A, the offset voltage sampling circuit 145b may further include the dummy ramp signal generator $RSG_{DMY}$, and the first terminal of the first switch S1 may be connected to an output terminal of the dummy ramp signal generator $RSG_{DMY}$.

The dummy ramp signal generator $RSG_{DMY}$ may have the same structure as the ramp signal generator 140 of FIG. 1. The dummy ramp signal generator $RSG_{DMY}$ may include a current source $CS_{DMY}$ and a resistor $R_{DMY}$. The second power supply voltage VDDP may be applied to one end of the current source $CS_{DMY}$, and the other end of the current source $CS_{DMY}$ may be connected to one end of the resistor $R_{DMY}$. The first power supply voltage VSS may be applied to the other end of the resistor $R_{DMY}$. One end of the resistor $R_{DMY}$ may be the output terminal of the dummy ramp signal generator $RSG_{DMY}$.

The current source $CS_{DMY}$ may generate a dummy current $I_{DMY}$, and the dummy current $I_{DMY}$ may be provided to the resistor $R_{DMY}$. An amount of the dummy current $I_{DMY}$ and a resistance value of the resistor $R_{DMY}$ may be the same as or similar to the amount of the reference current $I_{RP}$ of the ramp signal generator 140 and the resistance value of the resistor $R_{RP}$, respectively.

A voltage at one end of the resistor $R_{DMY}$ may be output as the dummy ramp signal $RP_{DMY}$. The dummy ramp signal $RP_{DMY}$ may be the same as an output of the ramp signal generator 140 of FIG. 1, that is, the first ramp signal $V_{RP1}$.

In the period $T_{AV}$ in which the sampling control signal $DC_{ON}$ is at the active level (refer to FIG. 5), the dummy ramp signal $RP_{DMY}$ is input to the first terminal N1 of the sampling capacitor $C_{SMP}$, and the sampling capacitor $C_{SMP}$ may be charged with charges based on the dummy ramp signal $RP_{DMY}$. In other words, the sampling capacitor $C_{SMP}$ may sample an offset voltage based on the dummy ramp signal $RP_{DMY}$.

Referring to FIG. 4C, the offset voltage sampling circuit 145c may include a sampling capacitor $C_{SMP}$ and a plurality of sampling switches, for example, first to third sampling switches S1, S2, and S3.

The offset voltage sampling circuit 145c of FIG. 4C is a modified example of the offset voltage sampling circuit 145a of FIG. 4A, and thus, a difference from the offset voltage sampling circuit 145a of FIG. 4A will be mainly described and previously given description will be omitted.

Compared to the offset voltage sampling circuit 145a of FIG. 4A, a reference voltage $V_{REF}$ may be applied to a first terminal of the first switch S1 of the offset voltage sampling circuit 145c, and the reference voltage $V_{REF}$ may be the same as the initial value of the first ramp signal $V_{RP1}$ in the first period.

In the period $T_{AV}$ in which the sampling control signal $DC_{ON}$ is at the active level (refer to FIG. 5), the reference voltage $V_{REF}$ is input to the first terminal N1 of the sampling capacitor $C_{SMP}$, and the sampling capacitor $C_{SMP}$ may be charged with the charges based on the dummy ramp signal $RP_{DMY}$. In other words, the sampling switch $C_{SMP}$ may sample the offset voltage based on the reference voltage $V_{REF}$.

Figure 6A:
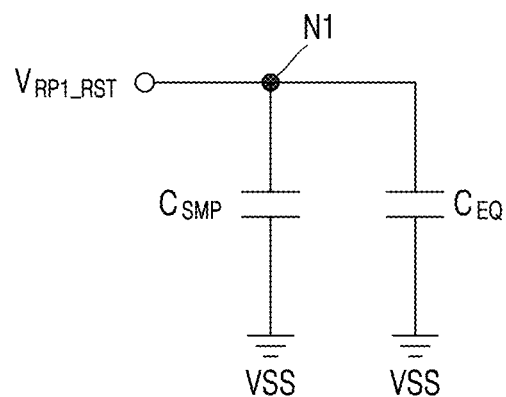
FIGS. 6A and 6B are diagrams illustrating an offset voltage sampling operation and a charge transmission operation of an offset voltage sampling circuit according to an embodiment.
Figure 6B:
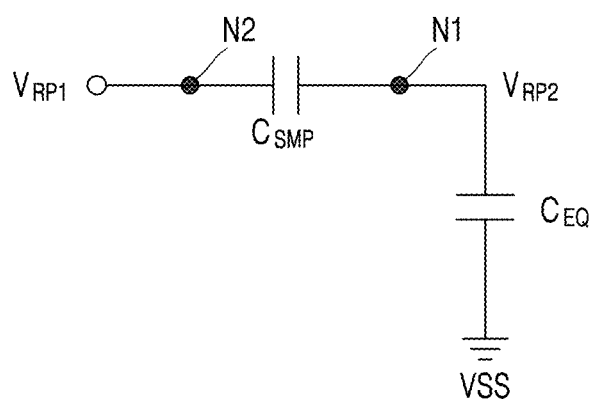

FIGS. 6A and 6B are diagrams illustrating offset voltage sampling operation and charge transmission operation of the offset voltage sampling circuit 145 according to an embodiment.

Referring to FIGS. 6A and 6B, the buffer 133 of FIG. 1 to which an output of the offset voltage sampling circuit 145, for example, the second ramp signal $V_{RP2}$ is applied may be equivalent to an equivalent capacitor $C_{EQ}$.

Referring to FIG. 6A, in the offset voltage sampling operation, for example, in the period $T_{AV}$ in which the sampling control signal $DC_{ON}$ of FIG. 5 is at the active level, as described above with reference to FIGS. 4A to 5, the sampling capacitor $C_{SMP}$ and the equivalent capacitor $C_{EQ}$ may be connected to each other in parallel by on and off of the first to third sampling switches S1, S2, and S3 of FIGS. 4A, 4B, and 4C and the initial value $V_{RP1\_RST}$ of the first ramp signal $V_{RP1}$ may be applied to the first terminal N1 of the sampling capacitor $C_{SMP}$. Accordingly, charges according to the initial value $V_{RP1\_RST}$ of the first ramp signal $V_{RP1}$ may be charged in the sampling capacitor $C_{SMP}$ and the equivalent capacitor $C_{EQ}$.

In the offset voltage sampling operation, a total amount of charges Q1 charged in the sampling capacitor $C_{SMP}$ and the equivalent capacitor $C_{EQ}$ may be represented by Equation 1.

$$Q1 = (C_{SMP} + C_{EQ}) \times V_{RP1\_RST} \quad \text{[EQUATION 1]}$$

Referring to FIG. 6B, in the charge transmission operation, for example, in the second period P2 of FIG. 5, as described above with reference to FIGS. 4A to 5, the first to third sampling switches S1, S2, and S3 of FIGS. 4A, 4B, and 4C are turned on/off, so that the sampling capacitor $C_{SMP}$ and the equivalent capacitor $C_{EQ}$ may be serially connected to each other, and the first ramp signal $V_{RP1}$ may be applied to the second terminal N2 of the sampling capacitor $C_{SMP}$.

In the offset voltage sampling operation, a total amount of charges Q2 charged in the sampling capacitor $C_{SMP}$ and the equivalent capacitor $C_{EQ}$ may be represented by Equation 2.

$$Q2 = C_{SMP} \times [V_{RP2}(N) - V_{RP1}] + C_{EQ} \times V_{RP2} \quad \text{[EQUATION 2]}$$

Here, N represents the number of buffers 133 connected to the offset voltage sampling circuit 145.

According to a charge conservation principle, a level (for example, a voltage level) of the second ramp signal $V_{RP2}$ applied to each of the N buffers 133 may be calculated as in Equation 3 based on Equations 1 and 2.

$$V_{RP2}(N) = \frac{C_{SMP} \times V_{RP1}}{C_{SMP} + C_{EQ}} + V_{RP1\_RST} \quad \text{[EQUATION 3]}$$

Because the first ramp signal $V_{RP1}$ is distributed by the sampling capacitor $C_{SMP}$ and the equivalent capacitor $C_{EQ}$, and the distributed signal is applied to the buffer 133, the first ramp signal $V_{RP1}$ is required to be amplified in a ratio of the sampling capacitor $C_{SMP}$ to the equivalent capacitor $C_{EQ}$. In addition, the offset voltage to be sampled in the offset voltage sampling operation, that is, the initial value $V_{RP1\_RST}$, may be set by the ramp signal generator 140 of FIG. 1.

Figure 7:
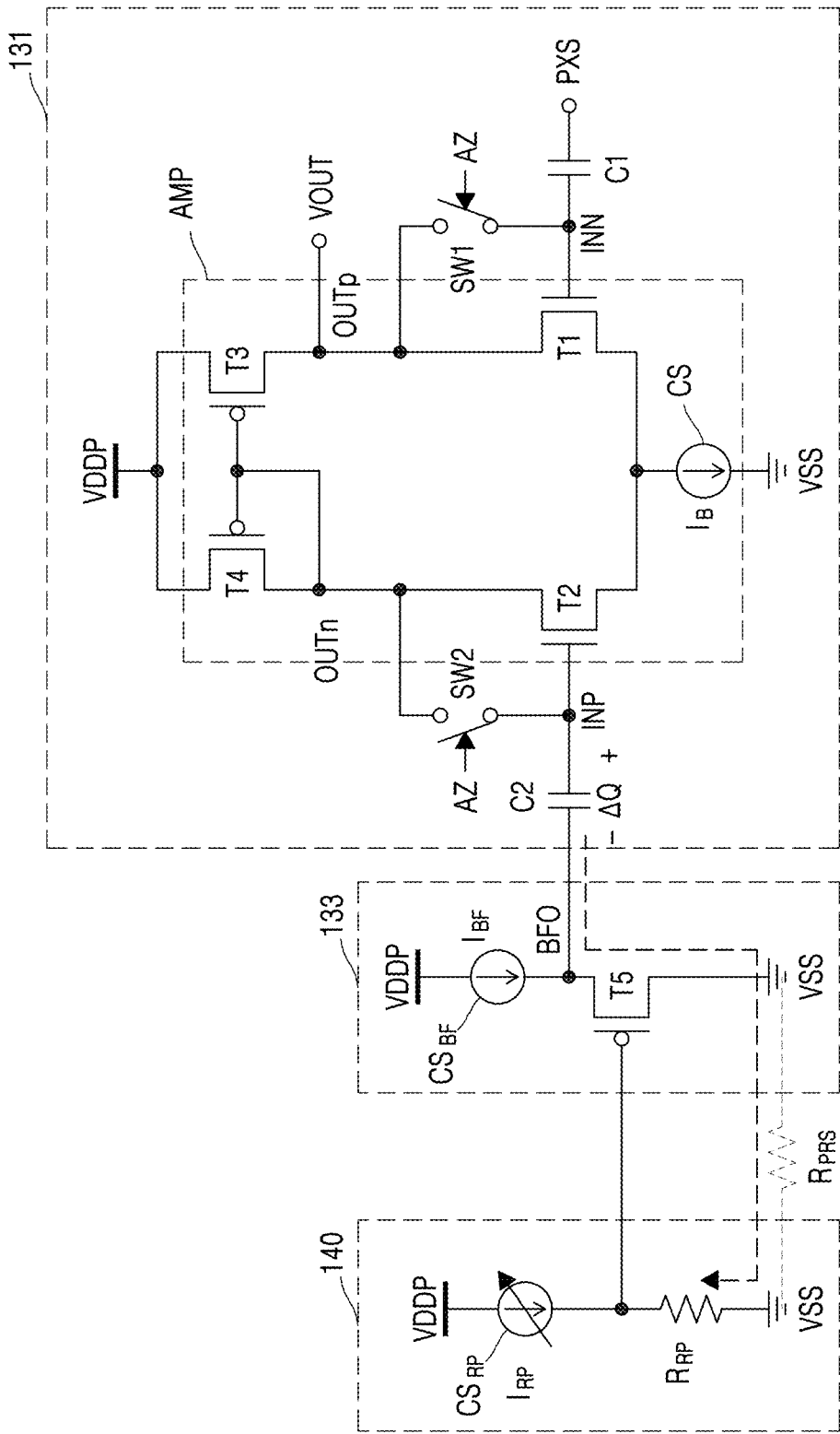
FIG. 7 illustrates a method of converting a pixel signal into a pixel value according to a comparative example.
Figure 8:
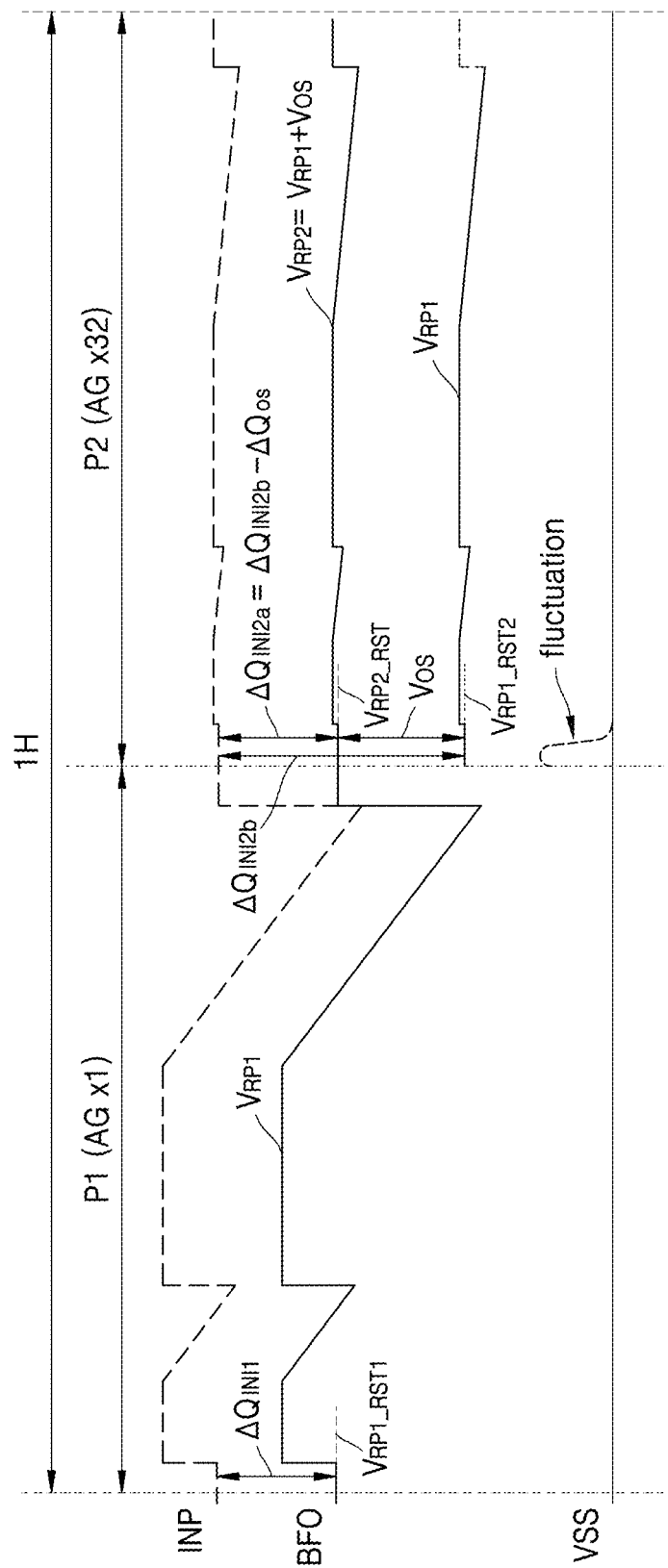
FIG. 8 illustrates an amount of charges charged in a second input capacitor of a comparator according to the comparative example and an embodiment.

FIG. 7 illustrates a method of converting a pixel signal into a pixel value according to a comparative example, and FIG. 8 illustrates an amount of charges charged in a second input capacitor of a comparator according to the comparative example and an embodiment.

According to the comparative example of FIG. 7, the output of the ramp signal generator 140, for example, the first ramp signal $V_{RP1}$, may be directly provided to the buffer 133. The first reference ramp signal having the first initial value and the first slope may be input to the buffer 133 as the first ramp signal $V_{RP1}$ in the first period, and the second reference ramp signal having the second initial value and the second slope may be input to the buffer 133 as the second ramp signal $V_{RP2}$ in the second period. In this case, the second initial value may be much less than the first initial value. The buffer 133 may buffer the received ramp signal to output the buffered ramp signal through an output terminal BFO. The buffer 133 may apply the first ramp signal $V_{RP1}$ to the second terminal of the second input capacitor C2 of the comparator 131.

At the beginning of each of the first and the second periods, the comparator 131 may perform an auto-zero operation based on the auto-zero signal AZ, and as the auto-zero operation is performed, the first input terminal INP of the comparator 131 is at an auto-zero level, the voltage of the auto-zero level is applied to the first terminal of the second input capacitor C2 connected to the first input terminal INP, and the initial value of the first ramp signal $V_{RP1}$ is applied to the second terminal of the second input capacitor C2. Accordingly, an amount of charges AQ according to voltages applied to both ends of the second input capacitor C2 may be charged.

FIG. 8 illustrates a voltage of the first input terminal INP of the comparator 131 and a voltage of the output terminal BFO of the buffer 133. In the first period P1, the voltage of the output terminal BFO of the buffer 133 may be the same as or similar to the first ramp signal $V_{RP1}$ in the first period P1.

As the auto-zero operation is performed at the beginning of the first period P1, an auto-zero-level voltage is applied to the first terminal of the second input capacitor C2 connected to the first input terminal INP of the comparator 131, and the first initial value $V_{RP1\_RST}$ of the first ramp signal $V_{RP1}$ is applied to the second terminal of the second input capacitor C2 connected to the output terminal BFO of the buffer 133. The second input capacitor C2 may be charged with a first charge amount $\Delta Q^{INT1}$ according to the auto-zero-level voltage and the first initial value of the first ramp signal $V_{RP1}$.

According to the comparative example of FIG. 7, the voltage of the output terminal BFO of the buffer 133 may be the same as or similar to the first ramp signal $V_{RP1}$ in the second period P2. As the auto-zero operation is performed in the second period P2, the auto-zero-level voltage may be applied to the first terminal of the second input capacitor C2, and a second initial value $V_{RP1\_RST2}$ of the first ramp signal $V_{RP1}$ may be applied to the second terminal of the second input capacitor C2. The second input capacitor C2 may be charged with a charge amount $\Delta Q_{INT2b}$ according to the auto-zero-level voltage and the second initial value $V_{RP1\_RST2}$ of the first ramp signal $V_{RP1}$.

As illustrated in FIG. 7, the second initial value $V_{RP1\_RST2}$ of the first ramp signal $V_{RP1}$ may be much less than the first initial value $V_{RP1\_RST1}$ of the first ramp signal $V_{RP1}$. Accordingly, the charge amount $\Delta Q_{INT2b}$ charged in the second input capacitor C2 in the second period may be significantly different from the charge amount $\Delta Q_{INT1}$ charged in the second input capacitor C2 in the first period P1, and in order to reduce the voltage level of the second terminal of the second input capacitor C2 from the first initial value $V_{RP1\_RST1}$ to the second initial value $V_{RP1\_RST2}$, charges may be discharged from the second input capacitor C2 through the fifth transistor T5.

In an embodiment, a power line providing the first power supply voltage VSS (for example, the ground voltage) to the buffer 133 may be connected to a power line providing the first power supply voltage VSS to the ramp signal generator 140, and the power lines may be equivalent to a parasitic resistor $R_{PRS}$. As a large amount of charges is discharged, a fluctuation may occur in the first power supply voltage VSS. In an example case in which the fluctuation occurs in the first power supply voltage VSS due to charge discharge in the buffer 133, the ramp signal generator 140 may also be affected. A pedestal error in which an offset occurs due to the fluctuation in the first power supply voltage VSS may occur in the first ramp signal $V_{RP1}$ generated by the ramp signal generator 140.

However, as described above, in the image sensor 100a according to the embodiment, the offset voltage sampling circuit 145 of FIG. 1 may sample an offset voltage Vos based on the second initial value $V_{RP1\_RST2}$ of the first ramp signal $V_{RP1}$ at the end of the first period P1 and may provide a signal obtained by adding the offset voltage Vos to the first ramp signal $V_{RP1}$ to the buffer 133 as the second ramp signal $V_{RP2}$ in the second period P2, and the buffer 133 may provide the buffered second ramp signal $V_{RP2}$ to the second input terminal of the second input capacitor C2. An initial value $V_{RP2\_RST}$ of the second ramp signal $V_{RP2}$ may be obtained by adding the offset voltage Vos to the second initial value $V_{RP1\_RST2}$ of the first ramp signal $V_{RP1}$. A charge amount $\Delta Q_{IN12a}$ according to the auto-zero-level voltage and the initial value $V_{RP2\_RST}$ of the second ramp signal $V_{RP2}$ may be charged in the second input capacitor C2.

The charge amount $\Delta Q_{INT2a}$ may have a value reduced by a charge amount $\Delta Q_{os}$ according to the offset voltage Vos from the charge amount $\Delta Q_{INT2a}b$ according to the comparative example in the second period P2, and does not have a significant difference from the charge amount $\Delta Q_{INT1}$ in the first period P1. In other words, the charge amount $\Delta Q_{INT2a}$ may be the same as or similar to the charge amount $\Delta Q_{INT1}$ in the first period P1. Because the amount of charges discharged from the second input capacitor C2 through the fifth transistor T5 is small, it is possible to prevent a fluctuation from occurring in the first power supply voltage VSS as in the comparative example.

Figure 9:
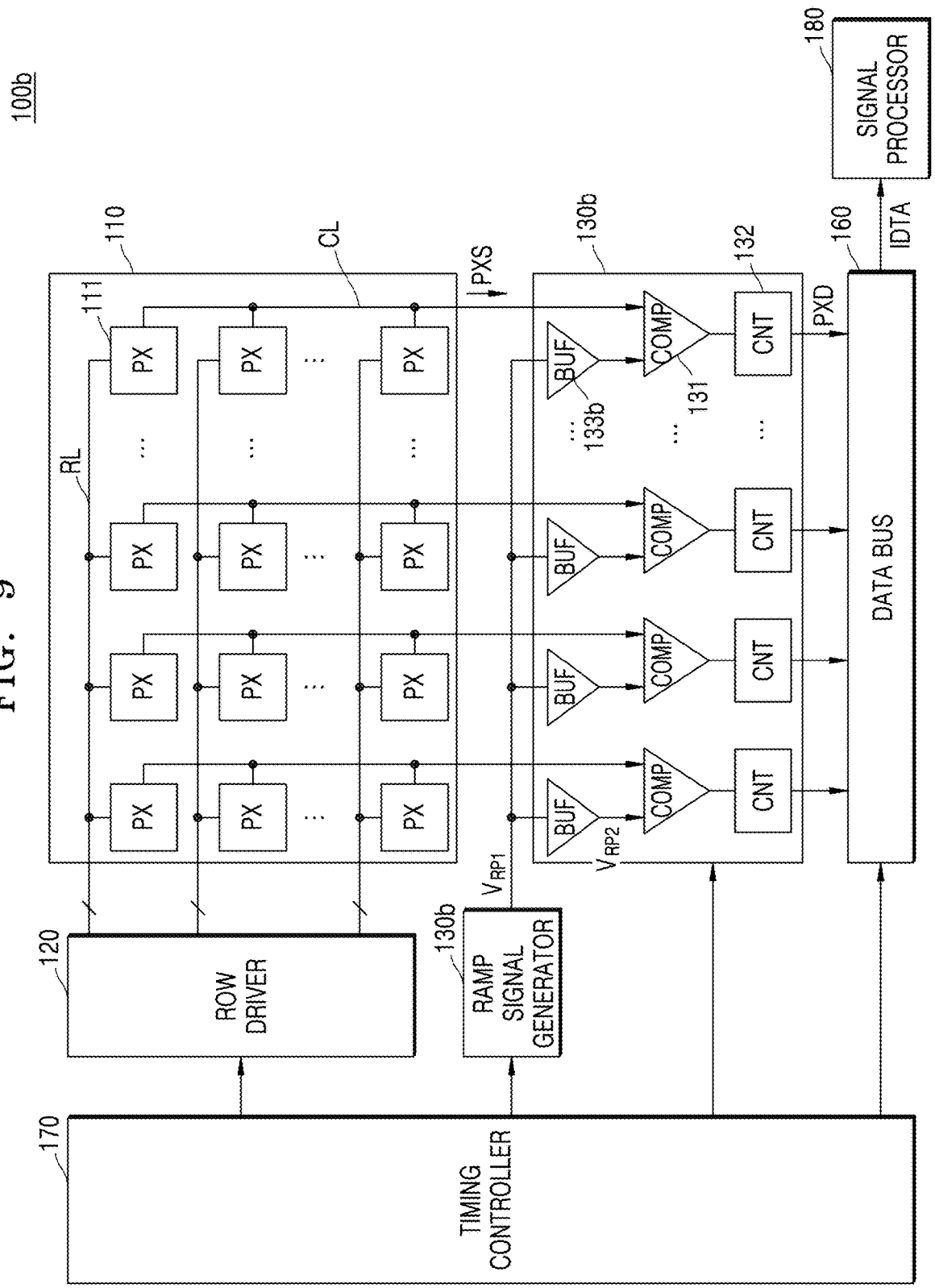
FIG. 9 is a block diagram illustrating an image sensor according to an embodiment.

FIG. 9 is a block diagram illustrating an image sensor 100b according to an embodiment.

Referring to FIG. 9, the image sensor 100b may include a pixel array 110, a row driver 120, an ADC circuit 130b, a ramp signal generator 140, a data bus 160, a timing controller 170, and a signal processor 180. The ADC circuit 130b may include a plurality of comparators 131, a plurality of counters 132, and a plurality of buffers 133b. The image sensor 100b of FIG. 9 is a modified example of the image sensor 100a of FIG. 1. Therefore, previously given description will be omitted and a difference will be mainly described.

The ramp signal generator 140 may generate the first ramp signal $V_{RP1}$ serving as a reference for ramp signals used by the ADC circuit 130b and may provide the first ramp signal $V_{RP1}$ to the plurality of buffers 133b of the ADC circuit 130b. As described above, the analog gain settings may be different in the first period and the second period, the first initial value of the first ramp signal $V_{RP1}$ in the first period may be different from the second initial value of the first ramp signal $V_{RP1}$ in the second period, and the second initial value may be less than the first initial value.

In a first period, each of the plurality of buffers 133b may buffer the first ramp signal $V_{RP1}$ and output the buffered first ramp signal $V_{RP1}$ as the second ramp signal $V_{RP2}$. In a second period, each of the plurality of buffers 133b may generate an offset voltage, add the offset voltage to the first ramp signal $V_{RP1}$, and output the signal obtained by adding the offset voltage to the first ramp signal $V_{RP1}$ as the second ramp signal $V_{RP2}$. Accordingly, even in a case in which the initial value of the first ramp signal $V_{RP1}$ is reduced in the second period, the initial value of the second ramp signal $V_{RP2}$ may be maintained the same as or similar to that in the first period.

Figure 10:
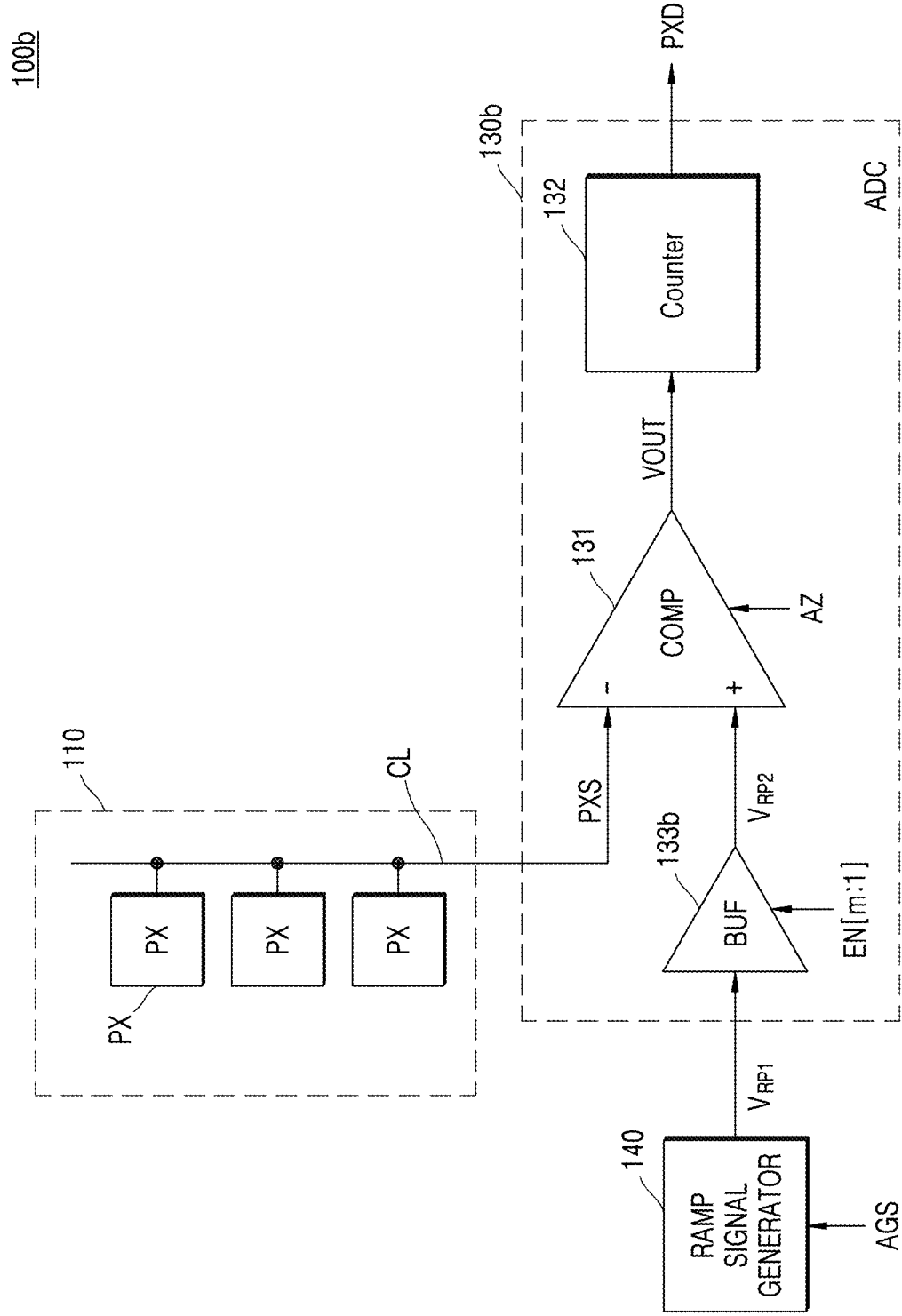
FIG. 10 illustrates converting a pixel signal into a pixel value in an image sensor according to an embodiment.
Figure 11:
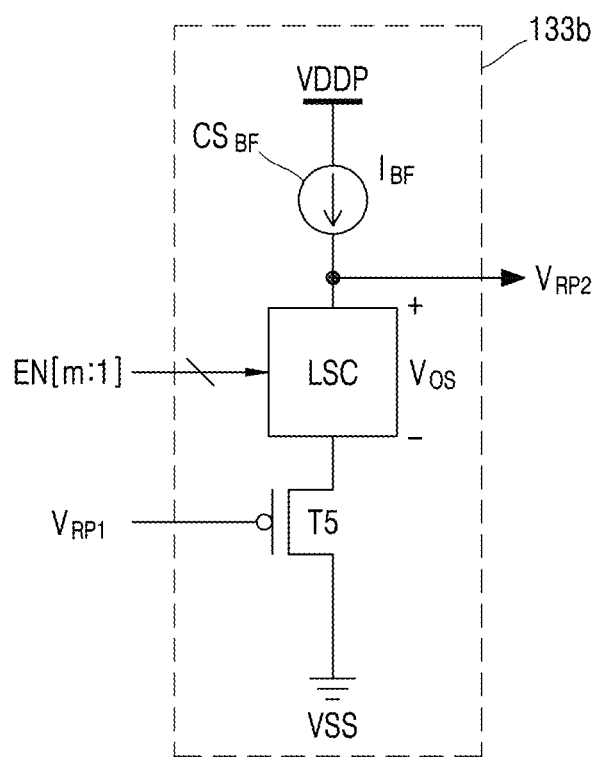
FIG. 11 illustrates a buffer according to an embodiment.

FIG. 10 illustrates that the image sensor 100b according to an embodiment converts a pixel signal into a pixel value, and FIG. 11 illustrates the buffer 133b according to an embodiment.

Operations of the pixel array 110, the ramp signal generator 140, the comparator 131, and the counter 132 in FIG. 10 are the same as the operations of the pixel array 110, the ramp signal generator 140, the comparator 131, and the counter 132 in FIG. 2. Accordingly, previously given description will be omitted and the buffer 133b will be described.

As described with reference to FIG. 9, the buffer 133b may generate the offset voltage in the second period and output the signal obtained by adding the offset voltage to the first ramp signal $V_{RP1}$ as the second ramp signal $V_{RP2}$. The buffer 133b may generate the offset voltage based on a plurality of received enable signals EN[m:1] (where m is an integer of 2 or more).

Referring to FIG. 11, the buffer 133b may be implemented as a source follower circuit, and may include a current source $CS_{BF}$, a level shifting circuit LSC, and a fifth transistor T5. A second power supply voltage VDDP may be applied to one end of the current source $CS_{BF}$, and a first power supply voltage VSS may be applied to the other end of the fifth transistor T5. Operations of the current source $CS_{BF}$ and the fifth transistor T5 are the same as the operations of the current source $CS_{BF}$ and the fifth transistor T5 described with reference to FIG. 4.

In the first period, each of the plurality of enable signals EN[m:1] may be at an active level, and both terminals of the level shifting circuit LSC may be shorted. Accordingly, the buffer 133b may output the second ramp signal $V_{RP2}$ generated based on the first ramp signal $V_{RP1}$. In this embodiment, the second ramp signal $V_{RP2}$ may be the same as the first ramp signal $V_{RP1}$.

In the second period, the buffer 133b may have one or more of the plurality of enable signals EN[m:1] be at an inactive level, and the level shifting circuit LSC may generate an offset voltage Vos based on the one or more enable signals at the inactive level. Accordingly, the buffer 133b may output the second ramp signal $V_{RP2}$ generated based on the signal obtained by adding the offset voltage Vos to the first ramp signal $V_{RP1}$. In an embodiment, the second ramp signal $V_{RP2}$ may be the same as the signal obtained by adding the offset voltage Vos to the first ramp signal $V_{RP1}$.

In the embodiment described above, in the first period, the plurality of enable signals EN[m:1] in the first period are at an active level, and in the second period, one or more of the plurality of enable signals EN[m:1] are at an inactive level. However, the disclosure is not limited thereto. As such, according to another embodiment, in the first period, the plurality of enable signals EN[m:1] in the first period may be at an inactive level, and in the second period, one or more of the plurality of enable signals EN[m:1] may be at an active level. In this case, during the second period, the level shifting circuit LSC may generate an offset voltage Vos based on the one or more enable signals at the active level.

Figure 12A:
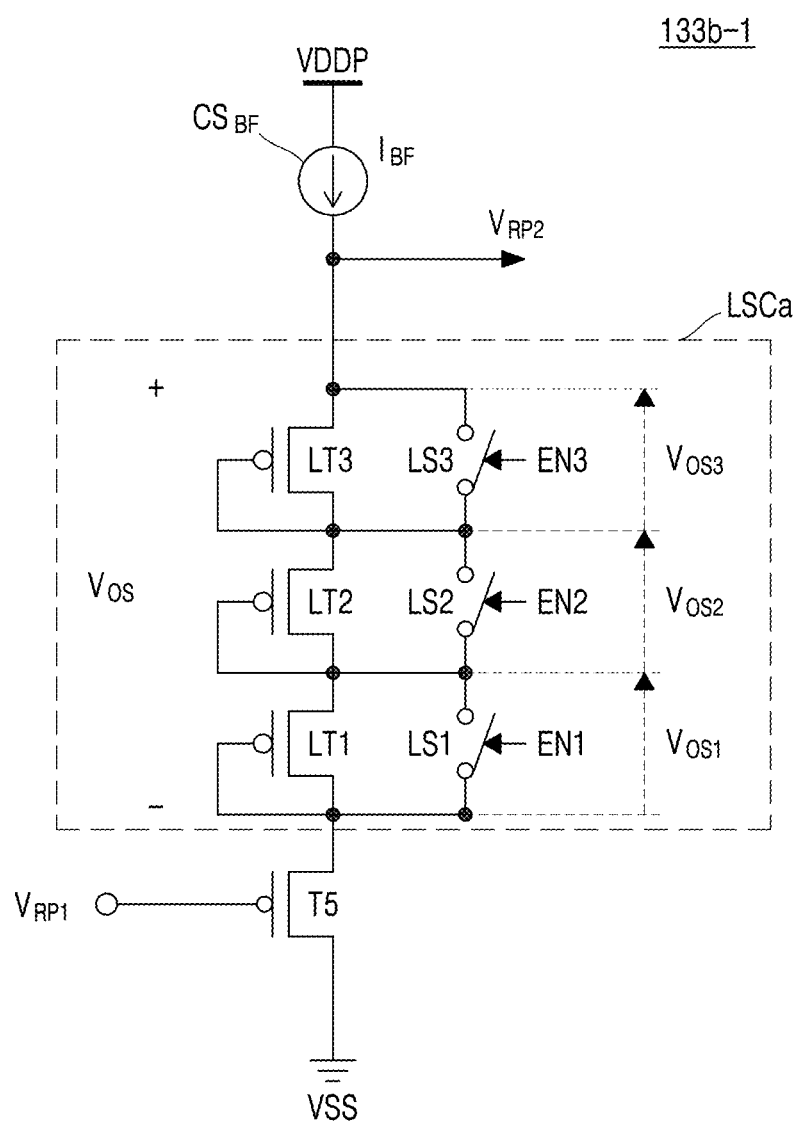
FIGS. 12A and 12B illustrate circuits of buffers according to embodiments.
Figure 12B:
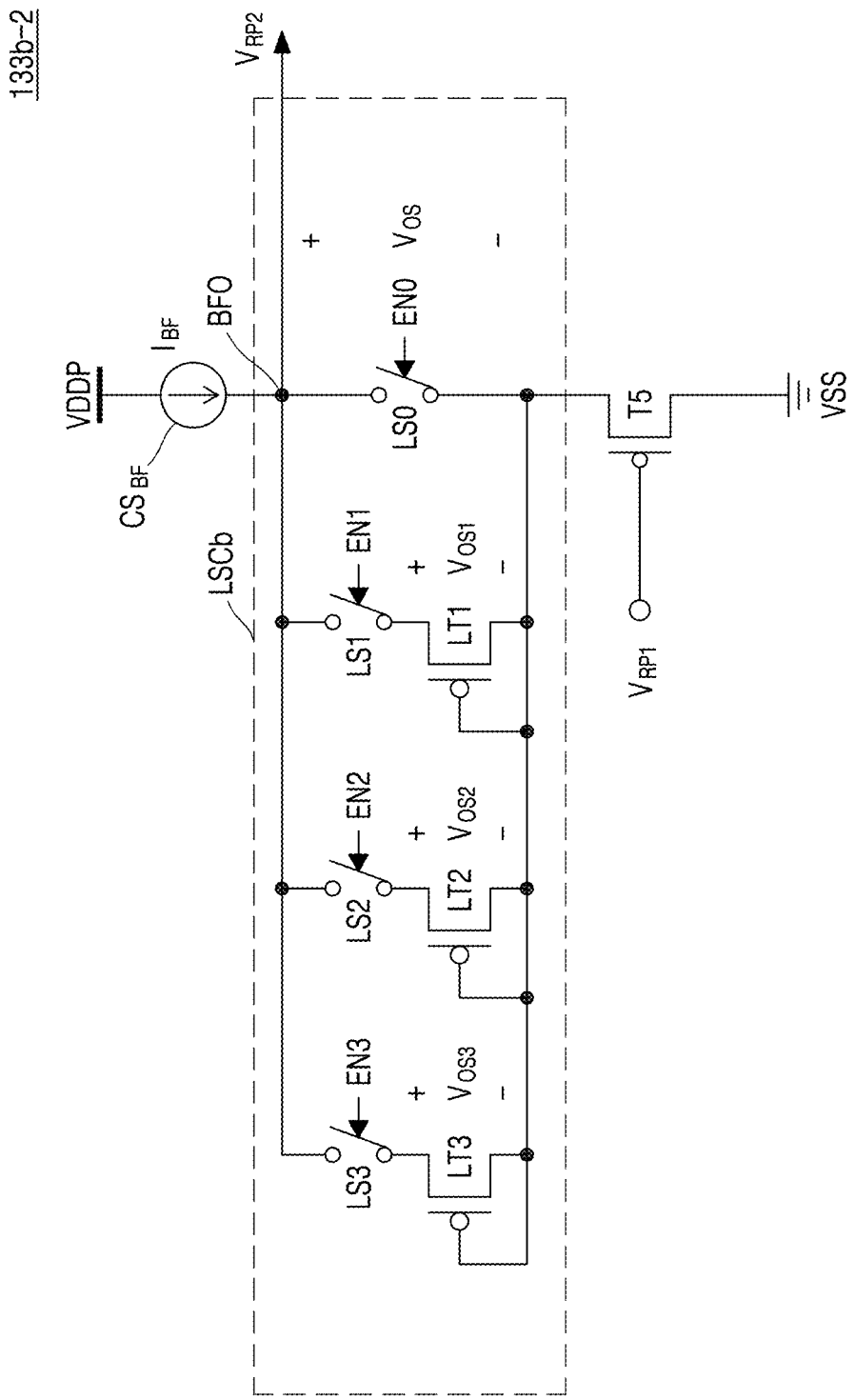

FIGS. 12A and 12B illustrate circuits of buffers 133b_1 and 133b_2 according to other embodiments.

Referring to FIG. 12A, the buffer 133b_1 may include a current source $CS_{BF}$, a level shifting circuit LSCa, and a fifth transistor T5.

The level shifting circuit LSCa may include a plurality of serially connected level shifting transistors and a plurality of level shifting switches each connected between both ends of each of the plurality of level shifting transistors. For example, the level shifting transistors may include a first shifting transistor LT1, a second shifting transistor LT2, and a third shifting transistor LT3, and the level shifting switches may include a first level shifting switch LS1, a second level shifting switch LS2, and a third level shifting switch LS3. In FIG. 12A, the level shifting circuit LSCa is illustrated as including three level shifting transistors and three level shifting switches. However, the disclosure is not limited thereto, and as such, according to another embodiment, the level shifting circuit LSCa may include one or more level shifting transistors and one or more level shifting switches.

The first to third level shifting transistors LT1, LT2, and LT3 may be implemented as PMOS transistors. However, the disclosure is not limited thereto, and as such, according to another embodiment, the first to third level shifting transistors LT1, LT2, and LT3 may be implemented as NMOS transistors. Sizes of the first to third level shifting transistors LT1, LT2, and LT3 may be the same as or different from one another. In an example, the size of the transistors may refer to a ratios of width to length of the transistors.

A gate terminal of each of the first to third level shifting transistors LT1, LT2, and LT3 is connected to a first terminal (for example, a drain terminal) of each of the first to third level shifting transistors LT1, LT2, and LT3, and the first to third level shifting transistors LT1, LT2, and LT3 operate as resistance elements.

The first to third level shifting switches LS1, LS2, and LS3 may be turned on or off based on a corresponding enable signal among a plurality of enable signals. The enable signals may include a first enable signal EN1, a second enable signal EN2, and a third enable signal EN3. The first to third level shifting switches LS1, LS2, and LS3 are turned on to short the first and second terminals of a corresponding level shifting transistor. In addition, in an example case in which the first to third level shifting switches LS1, LS2, and LS3 are turned off, a buffer current $I_{BF}$ flows through the corresponding level shifting transistor, so that an offset voltage may be generated between the first and second terminals of the corresponding level shifting transistor.

In an example case in which the first level shifting switch LS1 is turned off based on the first enable signal EN1 at an inactive level, a first offset voltage Vos1 may be formed between both terminals of the first level shifting transistor LT1. In an example case in which the second level shifting switch LS2 is turned off based on the second enable signal EN2 at an inactive level, a second offset voltage Vos2 may be formed between both terminals of the second level shifting transistor LT2. When the third level shifting switch LS3 is turned off based on the third enable signal EN3 at an inactive level, a third offset voltage Vos3 may be formed between both terminals of the third level shifting transistor LT3. In an example case in which the sizes of the first to third level shifting transistors LT1, LT2, and LT3 are the same, the first to third offset voltages Vos1, Vos2, and Vos3 may be the same. In an example case in which the sizes of the first to third level shifting transistors LT1, LT2, and LT3 are different, the first to third offset voltages Vos1, Vos2, and Vos3 may be different, and the sizes of the first to third level shifting transistors LT1, LT2, and LT3 may be in inverse proportion to the first to third offset voltages Vos1, Vos2, and Vos3. In an example case in which the size of the first level shifting transistor LT1 is ½ times the size of the second level shifting transistor LT2, the first offset voltage Vos1 may be twice the second offset voltage Vos2.

In an example case in which the first to third enable signals EN1, EN2, and EN3 are at active levels in the first period, both terminals of the level shifting circuit LSCa may be shorted, so that a ramp signal generated based on the first ramp signal $V_{RP1}$, for example, the first ramp signal $V_{RP1}$ may be output as the second ramp signal $V_{RP2}$.

In the second period, at least one of the first to third enable signals EN1, EN2, and EN3 may be at an inactive level, so that the resulting offset voltage Vos may be added to the ramp signal generated based on the first ramp signal $V_{RP1}$, for example, the first ramp signal $V_{RP1}$ and the ramp signal obtained by adding the offset voltage Vos to the first ramp signal $V_{RP1}$ may be output as the second ramp signal $V_{RP2}$. A magnitude of the offset voltage Vos generated by the level shifting circuit LSCa may be determined according to an enable signal at an inactive level among the first to third enable signals EN1, EN2, and EN3. In an example case in which the first and third enable signals EN1 and EN3 are at inactive levels, the offset voltage Vos may have a value obtained by adding the first offset voltage Vos1 and the third offset voltage Vos3.

Referring to FIG. 12B, the buffer 133b_1 may include a current source $CS_{BF}$, a level shifting circuit LSCb, and a fifth transistor T5.

The level shifting circuit LSCb may include a plurality of level shifting transistors connected in parallel a plurality of level shifting switches each serially connected to each of the plurality of level shifting transistors, and a short switch LS0. For example, the level shifting transistors may include a first shifting transistor LT1, a second shifting transistor LT2, and a third shifting transistor LT3, and the level shifting switches may include a first level shifting switch LS1, a second level shifting switch LS2, and a third level shifting switch LS3.

Sizes of the first to third level shifting transistors LT1, LT2, and LT3 may be the same as or different from one another.

A gate terminal of each of the first to third level shifting transistors LT1, LT2, and LT3 is connected to a first terminal (for example, a drain terminal) of each of the first to third level shifting transistors LT1, LT2, and LT3, and the first to third level shifting transistors LT1, LT2, and LT3 operate as resistance elements.

The first to third enable signals EN1, EN2, and EN3 may be at inactive levels in the first period, and at least one of the first to third enable signals EN1, EN2, and EN3 may be at an active level in the second period.

The first to third level shifting switches LS1, LS2, and LS3 may be turned on or off based on a corresponding enable signal among the first to third enable signals EN1, EN2, and EN3. In an example case in which the first to third level shifting switches LS1, LS2, and LS3 are turned off, a second terminal of a corresponding level shifting transistor may be floated. The first to third level shifting switches LS1, LS2, and LS3 are turned on to connect the second terminal of the corresponding level shifting transistor to an output terminal BFO, so that a current may flow through the corresponding level shifting transistor. In other words, a level shifting transistor corresponding to the turned-on level shifting switch may operate.

The short switch LS0 is connected between a terminal of the fifth transistor T5 and the output terminal BFO, and may be turned on or off based on a short signal EN0. The short switch LS0 may be turned on based on the short signal EN0 at an active level in the first period. Accordingly, the buffer current $I_{BF}$ may be applied to the fifth transistor T5 through the short switch LS0. The short switch LS0 may be turned off based on the short signal EN0 at an inactive level in the second period. In the second period, at least one of the first to third enable signals EN1, EN2, and EN3 may be an active level, and the buffer current $I_{BF}$ may flow through at least one level shifting transistor corresponding to at least one level shifting switch turned on based on at least one enable signal. In an example case in which two or more level shifting transistors operate, the buffer current $I_{BF}$ is distributed in inverse proportion to resistance values of the two or more level shifting transistors, and may flow through each of the two or more level shifting transistors.

In an embodiment, the size of the second level shifting transistor LT2 may be ½ times the size of the first level shifting transistor LT1, and the size of the third level shifting transistor LT3 may be ⅓ times the size of the first level shifting transistor LT1. In the second period, one of the first to third enable signals EN1, EN2, and EN3 may be at an active level, and the other two enable signals may be at inactive levels.

In an example case in which the first enable signal EN1 is at an active level, the first level shifting switch SL1 may be turned on, and the buffer current $I_{BF}$ may flow through the first level shifting transistor LT1. The first offset voltage Vos1 may be formed between both ends of the first level shifting transistor LT1, and the first offset voltage Vos1 may be output as an offset voltage Vos of the level shifting circuit LSCb.

In an example case in which the second enable signal EN2 is at an active level, the buffer current $I_{BF}$ may flow through the second level shifting transistor LT2. The second offset voltage Vos2 may be formed between both ends of the second level shifting transistor LT2. Because a resistance value of the second level shifting transistor LT2 is twice a resistance value of the first level shifting transistor LT1, the second offset voltage Vos2 may be twice the first offset voltage Vos1.

In an example case in which the third enable signal EN3 is at an active level, the buffer current $I_{BF}$ may flow through the third level shifting transistor LT3. The third offset voltage Vos3 may be formed between both ends of the third level shifting transistor LT3. Because a resistance value of the third level shifting transistor LT3 is three times a resistance value of the first level shifting transistor LT1, the third offset voltage Vos3 may be three times the first offset voltage Vos1.

In an embodiment, the sizes of the first to third level shifting transistors LT1, LT2, and LT3 may be the same. One or more of the first to third enable signals EN1, EN2, and EN3 may be at active levels in the second period. Because the first to third level shifting transistors LT1, LT2, and LT3 are connected in parallel, the total resistance value may decrease as the number of level shifting transistors operating based on an enable signal at an active level increases. Accordingly, as the number of enable signals at active levels increases, the offset voltage Vos may decrease.

In an example case in which one of the first to third enable signals EN1, EN2, and EN3 is at an active level, corresponding one of the first to third level shifting transistors LT1, LT2, and LT3 operates. In an example case in which two of the first to third enable signals EN1, EN2, and EN3 are at active levels, two corresponding level shifting transistors among the first to third level shifting transistors LT1, LT2, and LT3 operate. In an example case in which two level shifting transistors operate, the offset voltage Vos may be ½ times the offset voltage Vos of the case in which one level shifting transistor operates. In this way, the magnitude of the offset voltage Vos generated by the level shifting circuit LSCb may be determined by the number of enable signals at active levels.

Figure 13A:
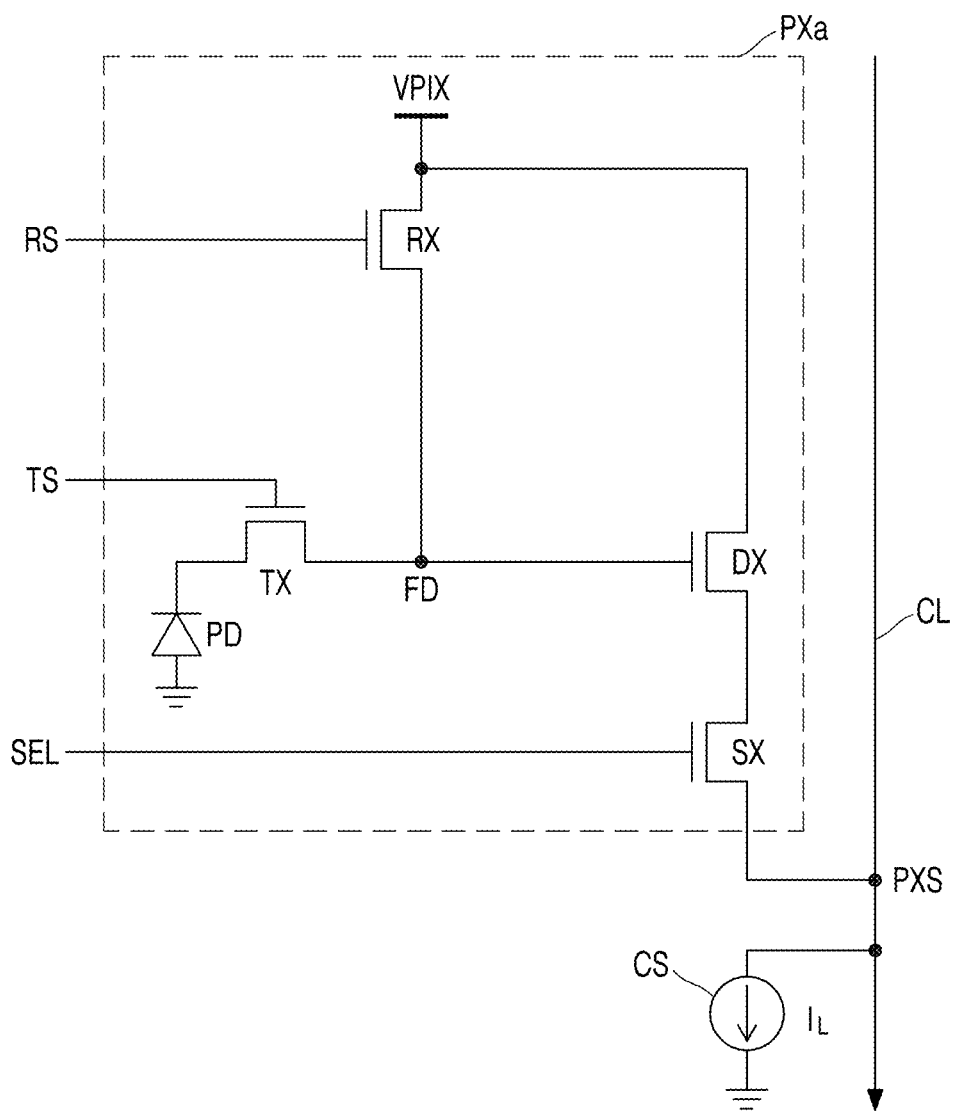
FIGS. 13A, 13B, and 13C are circuit diagrams illustrating implementations of pixels applied to image sensors according to embodiments.
Figure 13B:
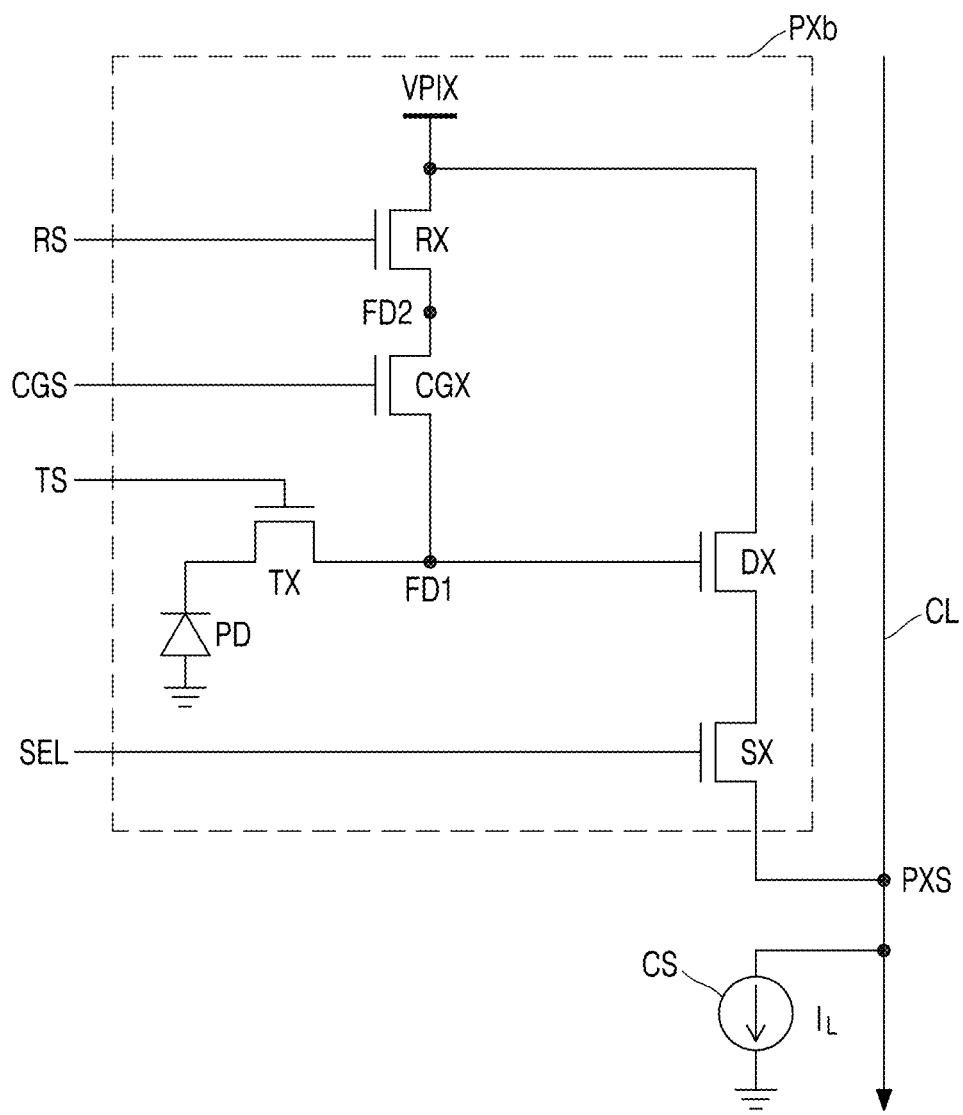
Figure 13C:
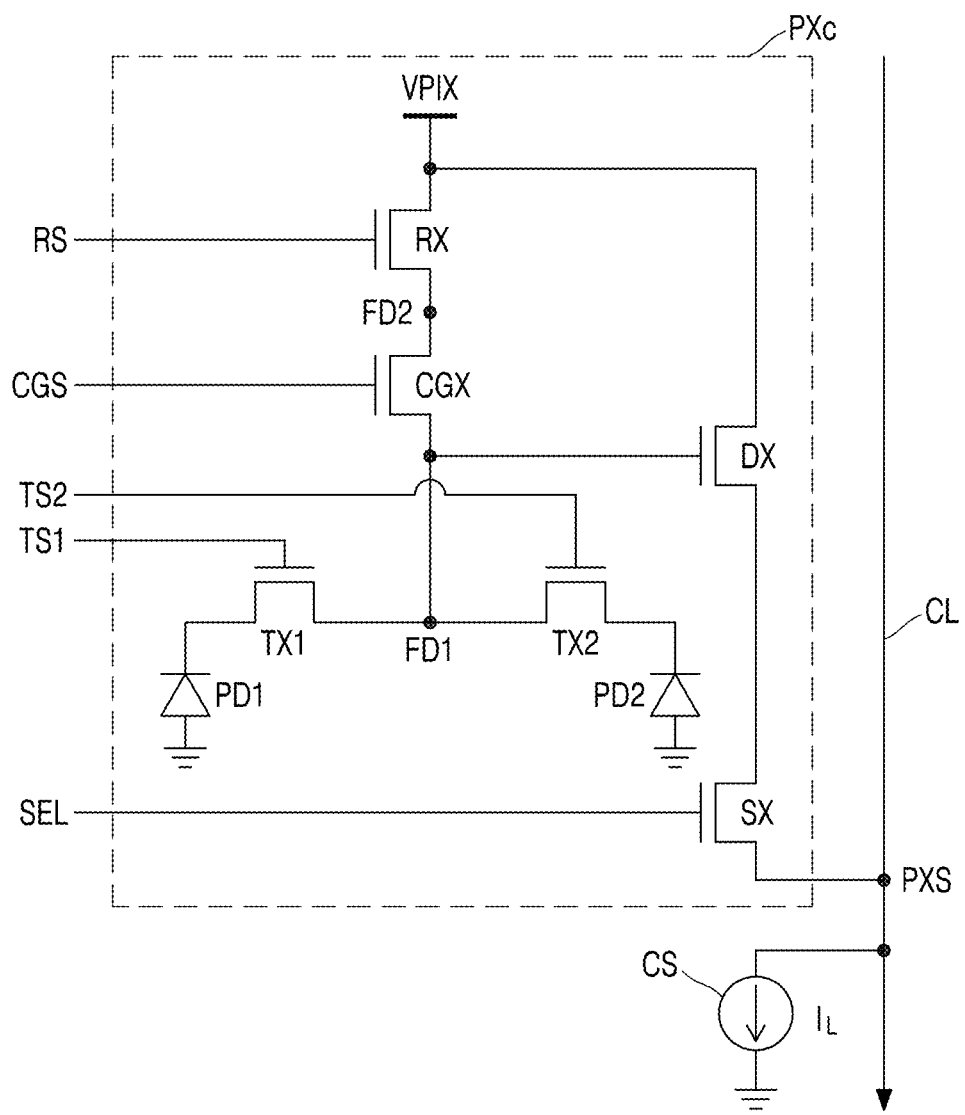

FIGS. 13A, 13B, and 13C are circuit diagrams illustrating implementations of pixels PXa, PXb, and PXc applied to image sensors 100a and 100b according to various embodiments.

Referring to FIG. 13A, the pixel PXa may include a photodiode PD, a transmission transistor TX, a reset transistor RX, a driving transistor DX (or a source follower), and a selection transistor SX. The transmission transistor TX, the reset transistor RX, and the selection transistor SX may operate based on the control signals provided by row driver 120 of FIGS. 1 and 9 For example, the control signals may include, but is not limited to, a transmission signal TS, a reset signal RS, and a selection signal SEL, respectively.

The reset transistor RX may reset a floating diffusion node FD based on the reset signal RS. The reset signal RS may be turned on to apply a pixel power supply voltage VPIX to the floating diffusion node FD, so that charges remaining in the floating diffusion node FD is removed, and a voltage level of the floating diffusion node FD may be the same as a voltage level of the pixel power supply voltage VPIX. The pixel power supply voltage VPIX may be the same as or different from the second power supply voltage VDDP.

The photodiode PD may generate and accumulate charges according to intensity of received light. For example, the photodiode PD may generate charges, that is, electrons with negative charges and holes with positive charges, in proportion to an amount of incident light.

The transmission transistor TX connected between the photodiode PD and the floating diffusion node FD may be turned on based on the transmission signal TS to transmit the charges accumulated in the photodiode PD to the floating diffusion node FD. The charges received through the transmission transistor TX may be accumulated in the floating diffusion node FD due to a capacitance formed in the floating diffusion node FD. The capacitance may be a parasitic capacitor formed in the floating diffusion node FD, and charges may be accumulated in the parasitic capacitor. The floating diffusion node FD has a voltage level corresponding to the accumulated charges. At this time, a ratio at which the charges of the floating diffusion node FD are converted into a voltage (for example, a voltage of the floating diffusion node FD) may be referred to as a conversion gain. In an embodiment, the capacitor of the floating diffusion node FD may be changed, and the conversion gain may be in inverse proportion to a size of the capacitor.

A first terminal of the driving transistor DX may be connected to the selection transistor SX, and the pixel power supply voltage VPIX may be applied to a second terminal of the driving transistor DX. A first terminal of the selection transistor SX may be connected to the driving transistor DX, and a second terminal of the selection transistor SX may be connected to the column line CL. The selection transistor SX may be turned on or off based on the selection signal SEL. In an example case in which the selection transistor SX is turned on during a readout operation for the pixel PXa, the driving transistor DX may operate as a source follower based on a bias current $I_L$ generated by the current source CS connected to the column line CL, and may output a voltage corresponding to the charges accumulated in the floating diffusion node FD as the pixel signal PXS.

Referring to FIG. 13B, the pixel PXb may include a photodiode PD, a transmission transistor TX, a reset transistor RX, a conversion gain transistor CGX, a driving transistor DX, and a selection transistor SX. The transmission transistor TX, the reset transistor RX, the conversion gain transistor CGX, and the selection transistor SX may operate based on the control signals provided by the row driver 120 of FIGS. 1 and 9, for example, the transmission signal TS, the reset signal RS, a gain control signal CGS, and the selection signal SEL.

A difference from the pixel PXa of FIG. 13A will be mainly described. The pixel PXb of FIG. 13B may further include a conversion gain transistor CGX connected between a reset transistor RX and a floating diffusion node (hereinafter, referred to as a first floating diffusion node FD1). The conversion gain transistor CGX may be turned on or off based on the gain control signal CGS. In an example case in which the conversion gain transistor CGX is turned on, a first terminal of the conversion gain transistor CGX, for example, a second floating diffusion node FD2 is connected to the first floating diffusion node FD1. In this case, a parasitic capacitor may also be formed in the second floating diffusion node FD2. Because the parasitic capacitor is formed in the second floating diffusion node FD2, the capacitance of the first floating diffusion node FD1 (for example, a capacitance of an equivalent capacitor connected to a gate terminal of the driving transistor DX) increases compared to a case in which the conversion gain transistor CGX is turned off.

Therefore, the pixel PXb operates in an HCG mode when the conversion gain transistor CGX is turned off, and operates in an LCG mode when the conversion gain transistor CGX is turned on.

Referring to FIG. 13C, the pixel PXc may include a plurality of photodiodes PD1 and PD2, a plurality of transmission transistors TX1 and TX2, a reset transistor RX, a conversion gain transistor CGX, a driving transistor DX, and a selection transistor SX. The plurality of transmission transistors TX1 and TX2, the reset transistor RX, the conversion gain transistor CGX, and the selection transistor SX may operate based on the control signals provided by the row driver 120 of FIGS. 1 and 9, for example, a plurality of transmission signals TS1 and TS2, a reset signal RS, a gain control signal CGS, and a selection signal SEL, respectively.

A difference from the pixel PXb of FIG. 13B will be mainly described. The pixel PXc may include a plurality of photodiodes, for example, a first photodiode PD1, a second photodiode PD2, and a plurality of transmission transistors respectively connected to the plurality of photodiodes, for example, a first transmission transistor TX1 and a second transmission transistor TX2. Two photodiodes and two transmission transistors are illustrated in FIG. 13C. However, the disclosure is not limited thereto, and as such, according to another embodiment, the pixel PXc may include three or more photodiodes and three or more transmission transistors.

In an embodiment, an image device to which the image sensor 100a in FIG. 1 or 100b in FIG. 9 is applied may provide an auto-focus function, and for this purpose, the pixel PXc may provide a binocular parallax signal. For example, a binocular parallax signal may be generated based on a pixel signal PXS (for example, a first pixel signal) generated based on charges generated by the first photodiode PD1 and a pixel signal PXS (for example, a second pixel signal) generated based on charges generated by the second photodiode PD2.

In an embodiment, sizes of the first photodiode PD1 and the second photodiode PD2 may be different. In an example case in which the size of the second photodiode PD2 is greater than that of the first photodiode PD1, a pixel signal PXS (for example, a first pixel signal) generated based on the charges generated by the first photodiode PD1 in one horizontal period is output, and then a pixel signal PXS (for example, a second pixel signal) based on the charges generated by the second photodiode PD2 may be output. The order of the output of signals by the first photodiode PD1 and the second photodiode PD2 is not limited thereto. An image signal with first brightness may be generated based on the first pixel signal, and an image signal with second brightness may be generated based on the second pixel signal. In this case, the second brightness may be higher than the first brightness.

In an embodiment, the sizes of the first photodiode PD1 and the second photodiode PD2 are the same, and an exposure time of the second photodiode PD2 in one frame may be greater than an exposure time of the first photodiode PD1. In one horizontal period, the pixel signal PXS (for example, the first pixel signal) generated based on the charges generated by the first photodiode PD1 may be output, and then the pixel signal PXS (for example, the second pixel signal) generated based on the charges generated by the second photodiode PD2 may be output. The image signal with the first brightness may be generated based on the first pixel signal, and the image signal with the second brightness may be generated based on the second pixel signal. In this case, the second brightness may be higher than the first brightness.

As described above, the pixels PXa, PXb, and PXc may have various structures, and may output a first pixel signal based on a small charge amount based on one exposure and a second pixel signal based on a small charge amount, or an LCG pixel signal based on a low conversion gain or a HCG signal based on a high conversion gain. Accordingly, the ramp signal generator 140 of FIGS. 1 and 9 may generate a plurality of reference ramp signals having different initial values and slopes according to analog gain settings, for example, a first reference ramp signal having a first initial value and a first slope and a second reference ramp signal having a second initial value and a second slope and may alternately output the first reference ramp signal and the second reference ramp signal as the first ramp signal $V_{RP1}$ and the comparator 131 of FIGS. 1 and 9 may compare the second ramp signal $V_{RP2}$ generated based on the first reference ramp signal with the first pixel signal and may compare the second ramp signal $V_{RP2}$ generated based on the signal obtained by adding the offset voltage to the second reference ramp signal with the second pixel signal.

Figure 14:
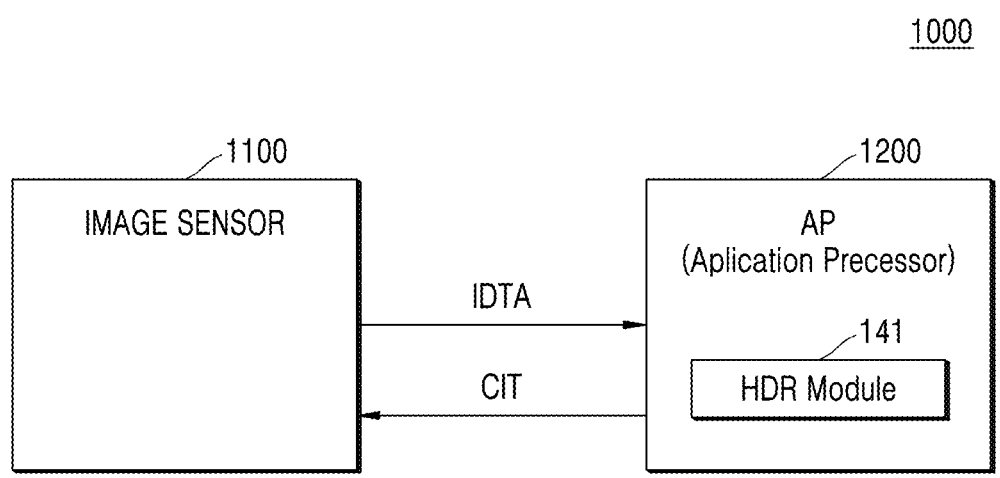
FIG. 14 is a block diagram schematically illustrating an electronic device including an image sensor according to an embodiment.

FIG. 14 is a block diagram schematically illustrating an electronic device 1000 including an image sensor 1100 according to an embodiment.

Referring to FIG. 14, the electronic device 1000 may include the image sensor 1100 and an application processor (AP) 1200. The electronic device 1000 may further include various components, such as other sensors, input/output devices, communication modules, etc. Other sensors may include a luminance sensor.

The AP 1200 may provide control signals CIT to the image sensor 1100. The control signals CIT may include signals for controlling an operation of the image sensor 1100. Transmission of the control signals CIT may be performed through an interface. For example, transmission of the control signals CIT may be performed based on an interface, such as, inter-integrated circuit (I2C) interface. The control signals CIT may further include configuration data of the image sensor 1100. For example, the configuration data may include, but is not limited to, a lens shading correction value, a crosstalk coefficient, an analog gain, a digital gain, and a frame rate setting value.

The image sensor 1100 may generate image data IDTA by capturing an image of an object. The image sensor 110 may capture the image based on the received control signals. The image data IDT may include still images and moving images. The image sensor 1100 may perform processing on the image (e.g., signal processing or data processing). The processing may include, but is not limited to, image quality compensation, binning, and downsizing on the image data IDT. The image quality compensation may include, but is not limited to, signal processing such as black level compensation, lens shading compensation, crosstalk compensation, and bad pixel correction.

The image sensor 100a or 100b described with reference to FIGS. 1 to 12B may be applied as the image sensor 1100. For example, the image sensor 1100 may include a pixel array 110, a ramp signal generator 140, an offset voltage sampling circuit 145 and a buffer 133 as illustrated in FIG. 1. The pixel array 110 may output first pixel signals with low brightness in a first period of one horizontal period and second pixel signals with low brightness in a second period of one horizontal period. In another embodiment, the pixel array 110 may output the LCG pixel signal in the first period and the HCG pixel signal in the second period.

The ramp signal generator 140 as illustrated in FIG. 1 may generate a plurality of reference ramp signals having different initial values and slopes. For example, the ramp signal generator 140 may generate a first reference ramp signal having a first initial value and a first initial value and a second reference ramp signal having a second initial value and a second slope, and may output the first reference ramp signal as the first ramp signal $V_{RP1}$ in the first period, and the second reference ramp signal as the first ramp signal $V_{RP1}$ in the second period.

In an embodiment, the offset voltage sampling circuit 145 as illustrated in FIG. 1 may provide the first ramp signal $V_{RP1}$ to the buffer 133 as illustrated in FIG. 1 as the second ramp signal $V_{RP2}$ in the first period. The offset voltage sampling circuit 145 may sample the offset voltage based on the first initial value, may add the offset voltage to the first ramp signal $V_{RP1}$ in the second period, and may provide the second ramp signal $V_{RP2}$ obtained by adding the offset voltage to the first ramp signal $V_{RP1}$ to the buffer 133. The buffer 133 may buffer the second ramp signal $V_{RP2}$ and output the second ramp signal $V_{RP2}$. Although the initial value of the first ramp signal $V_{RP1}$ changes in the second period, the initial value of the second ramp signal $V_{RP2}$ applied to the buffer 133 may be maintained the same as or similar to the initial value in the first period. Accordingly, the initial value of the output of the buffer 133 may also be maintained the same or similar in the first period and the second period.

In another embodiment, the image sensor 1100 may a buffer 133b as illustrated in FIG. 9. The buffer 133b of FIG. 9 may generate an offset voltage equal to or similar to the first initial value in the second period, may generate the second ramp signal $V_{RP2}$ based on the first ramp signal $V_{RP1}$ received from the ramp signal generator 140 in the first period, and may output the second ramp signal $V_{RP2}$. In addition, the buffer 133b may generate the second ramp signal $V_{RP2}$ based on a signal obtained by adding the offset voltage to the first ramp signal $V_{RP1}$ in the second period. In other words, the buffer 133b may generate and output the second ramp signal $V_{RP2}$ having an initial value level shifted from the second initial value of the first ramp signal $V_{RP1}$ in the second period. Accordingly, the initial value of the output of the buffer 133b may be maintained the same or similar in the first period and the second period.

The image sensor 1100 may transmit the image data IDTA or the signal processed image data IDTA to the AP 1200. The image sensor 1100 may transmit a plurality of image data items having different brightness, for example, the image data IDT including the first image data and second image data to the AP 1200.

The image data IDTA may be transmitted by using, for example, a camera serial interface (CSI) based on a mobile industry processor interface (MIPI). However, embodiments are not limited thereto, and as such, according to another embodiment, image data IDTA may be transmitted in another manner.

The AP 1200 may perform image processing such as bad pixel correction, 3A control (auto-focus correction, auto-white balance, and auto-exposure), noise reduction, sharpening, gamma control, remosaic, demosaic, or resolution scaling (video/preview) on the received image data IDTA.

In addition, the AP 1200 may generate a high dynamic range (HDR) image based on a plurality of image data items with different brightness, for example, the first image data and the second image data.

While the disclosure has been particularly shown and described with reference to embodiments thereof, it will be understood that various changes in form and details may be made therein without departing from the spirit and scope of the following claims.

What is claimed is:

1. An image sensor comprising:
    a pixel array comprising a plurality of pixels;
    a ramp signal generating circuit configured to output a first reference ramp signal with a first slope as a first ramp signal in a first period and a second reference ramp signal with a second slope as the first ramp signal in a second period different from the first period;
    an offset voltage sampling circuit configured to:
        receive the first ramp signal from the ramp signal generating circuit,
        obtain an offset voltage based on a direct current (DC) level of the first reference ramp signal,
        output the first ramp signal in the first period, and
        output a second ramp signal obtained by adding the offset voltage to the first ramp signal in the second period;
    a buffer configured to buffer and output the first ramp signal or the second ramp signal received from the offset voltage sampling circuit; and
    an analog-to-digital conversion (ADC) circuit configured to convert a pixel signal from the pixel array into a digital pixel value based on a comparison of the pixel signal with the first ramp signal or the second ramp signal from the buffer.

2. The image sensor of claim 1, wherein the DC level of the first reference ramp signal is higher than a DC level of the second reference ramp signal, and
    wherein the first slope is greater than the second slope.

3. The image sensor of claim 1, wherein the offset voltage sampling circuit comprises:
    a sampling capacitor comprising a first terminal connected to an input terminal of the buffer and a second terminal connected to an output terminal of the ramp signal generating circuit;
    a first switch configured to turn on based on a first switching signal to provide the offset voltage to the first terminal of the sampling capacitor;
    a second switch configured to turn on based on the first switching signal to provide a first power supply voltage to the second terminal of the sampling capacitor; and
    a third switch configured to turn off based on a second switching signal corresponding to a complementary signal of the first switching signal to block an electrical connection between the output terminal of the ramp signal generating circuit and the second terminal of the sampling capacitor.

4. The image sensor of claim 3, wherein the sampling capacitor is configured to store a voltage corresponding to a difference between the offset voltage and the first power supply voltage.

5. The image sensor of claim 3,
    wherein a first terminal of the first switch is connected to the output terminal of the ramp signal generating circuit and a second terminal of the first switch is connected to the first terminal of the sampling capacitor, and
    wherein the first switch is further configured to provide the DC level of the first reference ramp signal to the first terminal of the sampling capacitor as the offset voltage.

6. The image sensor of claim 3,
    wherein the offset voltage sampling circuit further comprises a dummy ramp signal generating circuit, and
    wherein the first switch is further configured to provide a voltage output from the dummy ramp signal generating circuit to the first terminal of the sampling capacitor as the offset voltage based on receiving the first switching signal.

7. The image sensor of claim 6,
    wherein the dummy ramp signal generating circuit has a same structure as the ramp signal generating circuit.

8. The image sensor of claim 3,
    wherein a reference voltage is applied to a first terminal of the first switch, and a second terminal of the first switch is connected to the first terminal of the sampling capacitor, and
    wherein the first switch is further configured to provide the reference voltage to the first terminal of the sampling capacitor as the offset voltage.

9. The image sensor of claim 1, wherein the ramp signal generating circuit comprises:
    a resistance element; and
    a current source configured to generate a first ramp current having a first initial amount in the first period and a second ramp current having a second initial amount in the second period, the first initial amount being greater than the second initial amount,
    wherein the first ramp current or the second ramp current flows thought the resistance element.

10. The image sensor of claim 1,
    wherein the pixel array is configured to operate in a first conversion gain mode in the first period to output a first pixel signal and operate in a second conversion gain mode in the second period to output a second pixel signal,
    wherein the ADC circuit is further configured to compare the first pixel signal from the pixel array in the first period with the first ramp signal and compare the second pixel signal from the pixel array in the second period with the second ramp signal.

11. The image sensor of claim 1,
    wherein the ADC circuit comprises a comparator configured to compare the pixel signal with the first ramp signal or the second ramp signal, and output a result based on the comparison of the pixel signal with the first ramp signal or the second ramp signal, and
    wherein the comparator comprises:
        a differential amplifier configured to amplify a difference between a signal applied to a first input terminal and a signal applied to a second input terminal to output the amplified difference;
        a first input capacitor having a first terminal connected to the first input terminal of the differential amplifier and a second terminal configured to receive an output of the buffer; and
        a second input capacitor connected to the second input terminal of the differential amplifier and having a first terminal and a second terminal configured to receive the pixel signal.

12. The image sensor of claim 11,
    wherein the first input capacitor is configured to store a first charge amount corresponding to a difference between a first initial level of the differential amplifier and the first ramp signal in the first period, and a second charge amount corresponding to a difference between a second initial level of the differential amplifier and the second ramp signal in the second period, and wherein the second charge amount is less than a third charge amount corresponding to a difference between the second initial level and the second reference ramp signal.

13. An image sensor comprising:
a pixel array comprising a plurality of pixels;
a ramp signal generating circuit configured to output a first ramp signal;
an offset voltage sampling circuit configured to obtain an offset voltage based on a direct current (DC) level of the first ramp signal in a first period;
a buffer configured to:
  buffer the first ramp signal and output the buffered first ramp signal as a ramp signal in the first period, and
  buffer a second ramp signal obtained by adding the offset voltage to the first ramp signal and output the buffered second ramp signal as the ramp signal in a second period different from the first period; and
an analog-to-digital conversion (ADC) circuit configured to convert a pixel signal from the pixel array into a digital pixel value based on a comparison of the pixel signal with the ramp signal from the buffer.

14. The image sensor of claim 13,
wherein the ramp signal generating circuit is further configured to output a first reference ramp signal having a first initial voltage and a first slope as the first ramp signal in the first period and output a second reference ramp signal having a second initial voltage and a second slope as the first ramp signal in the second period,
wherein the first initial voltage is higher than the second initial voltage, and
wherein the first slope is greater than the second slope.

15. The image sensor of claim 13,
wherein the offset voltage sampling circuit is further configured to:
  receive the first ramp signal from the ramp signal generating circuit,
  in the first period, output the first ramp signal to the buffer in the first period,
  in the second period, add the offset voltage to the first ramp signal to generate the second ramp signal, and output the second ramp signal to the buffer.

16. The image sensor of claim 13, wherein the offset voltage sampling circuit further comprises:
a sampling capacitor configured to store the offset voltage, the sampling capacitor connected between an output terminal of the ramp signal generating circuit and an input terminal of the buffer; and
one or more switches configured to provide the offset voltage to the sampling capacitor based on switching signals.

17. The image sensor of claim 13, wherein the buffer comprises a source follower circuit.

18. The image sensor of claim 13, wherein a first pixel value generated in the first period is included in first image data and a second pixel value generated in the second period is included in second image data, and a high dynamic range (HDR) image is generated based on the first image data and the second image data.

19. An electronic device comprising:
an image sensor configured to generate a first image with a first brightness value and a second image with a second brightness value; and
an image signal processor configured to generate a high dynamic range (HDR) image by merging the first image and the second image from the image sensor,
wherein the image sensor comprises:
  a pixel array comprising a plurality of pixels;
  a ramp signal generating circuit configured to:
    generate a first reference ramp signal with a first direct current (DC) level as a first ramp signal in a first period, and
    generate a second reference ramp signal with a second DC level lower than the first DC level as the first ramp signal in a second period different from the first period;
  a buffer configured buffer and output a second ramp signal generated based on the first ramp signal;
  an offset voltage sampling circuit connected between the ramp signal generating circuit and the buffer, the offset voltage sampling circuit configured to:
    obtain an offset voltage based on the first DC level,
    in a first period, output the first reference ramp signal to the buffer as the second ramp signal, and
    in a second period, add the offset voltage to the second reference ramp signal to generate a third ramp signal, and output the third ramp signal to the buffer as the second ramp signal; and
  an analog-to-digital conversion (ADC) circuit configured to convert a pixel signal from the pixel array into a digital pixel value based on a comparison of the pixel signal with the second ramp signal from the buffer.

20. The electronic device of claim 19, wherein the offset voltage sampling circuit comprises:
a sampling capacitor comprising a first terminal connected to an input terminal of the buffer and a second terminal connected to an output terminal of the ramp signal generating circuit;
a first switch configured to turn on based on a first switching signal to provide the offset voltage to the first terminal of the sampling capacitor;
a second switch configured to turn on based on the first switching signal to provide a first power supply voltage to the second terminal of the sampling capacitor; and
a third switch configured to turn off based on a second switching signal corresponding to a complementary signal of the first switching signal to block an electrical connection between an output terminal of the ramp signal generating circuit and the second terminal of the sampling capacitor.

* * * * *